United States Patent [19]

Williams et al.

[11] Patent Number: 5,001,645

[45] Date of Patent: Mar. 19, 1991

[54] ADAPTIVE CONTROL SYSTEM FOR AN ENGINE

[75] Inventors: David Williams, Kingsbury; John M. Ironside, Birmingham, both of England

[73] Assignee: Lucas Industries Public Limited Company, Birmingham, England

[21] Appl. No.: 143,508

[22] Filed: Jan. 13, 1988

[30] Foreign Application Priority Data

Jan. 14, 1987 [GB] United Kingdom ............... 8700759

[51] Int. Cl.$^5$ ............................................. F02D 43/00
[52] U.S. Cl. ........................ 364/431.08; 364/431.04; 364/148; 364/158; 123/419; 123/436
[58] Field of Search ............... 364/431.01, 431.05, 364/158, 471.07, 431.08, 431.04, 513, 148; 123/419, 436

[56] References Cited

U.S. PATENT DOCUMENTS

| | | | |
|---|---|---|---|
| 4,381,84 | 5/1983 | Aberson | 123/156 |
| 3,142,967 | 8/1964 | Schweitzer | |
| 3,327,553 | 6/1967 | Peras | |
| 3,789,816 | 2/1974 | Taplin et al. | 123/494 |
| 4,026,251 | 5/1977 | Schweitzer et al. | 364/442 |
| 4,138,979 | 2/1979 | Taplin | 123/119 EC |
| 4,181,944 | 1/1980 | Yamauchi et al. | 364/431 |
| 4,257,377 | 3/1981 | Kinugawa et al. | 123/492 |
| 4,259,723 | 3/1981 | Fujisawa et al. | 123/493 |
| 4,268,910 | 5/1981 | Omori et al. | 123/425 |
| 4,276,860 | 7/1981 | Capurka | 123/415 |
| 4,306,284 | 12/1981 | Malcolm | 364/431.01 |
| 4,319,327 | 3/1982 | Higashiyama et al. | 364/431.05 |
| 4,328,779 | 5/1982 | Hattori et al. | 123/416 |
| 4,344,140 | 8/1982 | Leung | 364/431.08 |
| 4,351,281 | 9/1982 | Geiger et al. | 123/425 |

(List continued on next page.)

FOREIGN PATENT DOCUMENTS

| | | |
|---|---|---|
| 0120730 | 7/1984 | European Pat. Off. |
| 0155680 | 9/1985 | European Pat. Off. |
| 0234715 | 9/1987 | European Pat. Off. |
| 1257779 | 12/1971 | United Kingdom |
| 1491622 | 2/1975 | United Kingdom |
| 1543379 | 3/1976 | United Kingdom |
| 2034930 | 4/1979 | United Kingdom |
| 2005443 | 11/1979 | United Kingdom |
| 2042637 | 1/1980 | United Kingdom |
| 2049238 | 1/1980 | United Kingdom |
| 2060062 | 1/1980 | United Kingdom |
| 2099918 | 11/1982 | United Kingdom |
| 2107785 | 7/1983 | United Kingdom |
| 2140082 | 11/1984 | United Kingdom |
| 2165063 | 11/1985 | United Kingdom |
| 2169956 | 7/1986 | United Kingdom |

OTHER PUBLICATIONS

Garrigues et al., An Extrema Searching Controller for Mixture Strength Optimization on an Internal Combustion Engine, European Conference on Electronics, Mar. 28, 1980.
Optimizing Control of Diesel Injection Timing, D. B.

(List continued on next page.)

*Primary Examiner*—Parshotam S. Lall
*Assistant Examiner*—V. Trans
*Attorney, Agent, or Firm*—Nixon & Vanderhye

[57] ABSTRACT

An adaptive control system is provided for an internal combustion engine having at least two control inputs which affect an engine output. The system involves establishing a first base value for a first control input as a function of engine operating conditions and establishing a second base value for a second control input as a function of engine operating conditions. Corrections are applied in accordance with a predetermined control strategy to the first base value and the second base value to obtain a first corrected value for the first control input and a second corrected value for the second control input. A particular control input is periodically perturbed, and the engine output is monitored. The actual slope or differential of the engine output with respect to the particular control input is determined. The control strategy is predetermined to cause the actual slope to correspond to a desired value and to allow corrections to be applied to the first and second base values after corrections have become stabilized.

43 Claims, 12 Drawing Sheets

U.S. PATENT DOCUMENTS

| | | | |
|---|---|---|---|
| 4,357,662 | 11/1981 | Schira et al. | 364/431.08 |
| 4,375,668 | 3/1983 | Leung et al. | 364/431.08 |
| 4,379,239 | 4/1983 | Knuefelmann et al. | 123/609 |
| 4,379,333 | 4/1983 | Ninomiya et al. | 123/419 |
| 4,381,748 | 5/1983 | Eckert et al. | 123/494 |
| 4,389,992 | 6/1983 | Shigematsu et al. | 123/419 |
| 4,403,584 | 9/1983 | Suzuki et al. | 123/417 |
| 4,433,381 | 2/1984 | Wolkinson | 364/431.05 |
| 4,448,162 | 5/1984 | Ninomiya et al. | 123/419 |
| 4,454,750 | 6/1984 | Yoshida et al. | 73/35 |
| 4,467,765 | 8/1984 | Suzuki et al. | 123/419 |
| 4,471,736 | 9/1984 | Yoshida et al. | 123/425 |
| 4,478,185 | 10/1984 | Obayashi et al. | 123/419 |
| 4,479,476 | 10/1984 | Suzuki et al. | 123/478 |
| 4,498,438 | 2/1985 | Sato | 123/418 |
| 4,502,442 | 3/1985 | Takakuwa et al. | 123/419 |
| 4,503,824 | 3/1985 | Ninomiya et al. | 123/436 |
| 4,509,477 | 4/1985 | Takao et al. | 123/419 |
| 4,513,718 | 9/1985 | Ishii et al. | 123/425 |
| 4,527,524 | 7/1985 | Guipaud | 123/425 |
| 4,527,526 | 7/1985 | Akasu | 123/425 |
| 4,535,406 | 8/1985 | Johnson | 364/431.05 |
| 4,539,957 | 9/1985 | Haraguchi et al. | 123/425 |
| 4,547,852 | 10/1985 | Kamufugi et al. | 364/431.04 |
| 4,575,800 | 3/1986 | Kittelson | 364/431.05 |
| 4,586,473 | 5/1986 | Nguyen | 123/419 |
| 4,596,217 | 6/1986 | Bonitz et al. | 123/425 |
| 4,653,449 | 3/1987 | Kamei et al. | 123/478 |
| 4,691,286 | 9/1987 | Obayashi et al. | 364/431.04 |
| 4,706,196 | 11/1987 | Muramatsu et al. | 364/431.05 |
| 4,715,344 | 12/1987 | Tomisawa | 123/489 |
| 4,799,469 | 1/1989 | Nagano et al. | 123/418 |
| 4,843,556 | 6/1989 | Wakeman et al. | 364/431.08 |

OTHER PUBLICATIONS

Kittelson and M. J. Pipho, University of Minnesota, U.S.A.

Lean Limit A/F Control System by using Engine Speed Variation Ina et al., SAE Paper 860413.

Article/"Notes Resulting from a USSR Action-M & C Letter 6/4/'87", 6 pages dated May 8, 1987 by John M. Ironside.

"Electronic Spark Timing Control for Motor Vehicles", Society of Automotive Engineers Technical Paper Series, Jun. 5-9, 1978, No. 780655, by Paul H. Schweitzer and Thomas W. Collins.

"Flame Arrival Sensing Fast Response Double Closed Loop Engineer Management", No. 84044 by Michael G. May, Antipollution Industrial Research S.A.

"Adaptive On-Line Steady-State Optimization of Slow Dynamic Processes", Bamberger and Isermann.

"Adaptive Control of Extremum Systems", Jan Sternby, Depart. of Automatic Control, Lund Institute of Technology, Lund, Sweden, pp. 1-10.

"Recursive Approaches to Times Series Analysis", Peter Young, May/Jun. 1974, pp. 209-224.

"Adaptive Filtering Prediction and Control", pp. 91-94.

"Tracking of Slowly Varying Parameters by Directional Forgetting", IFAC Congress, Budapest, 1984.

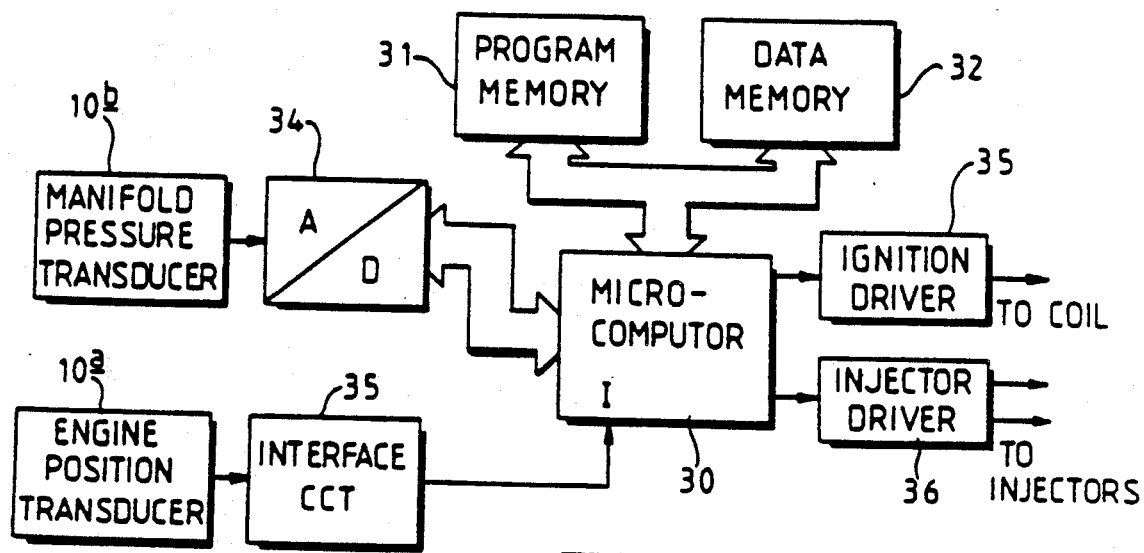
FIG. 5
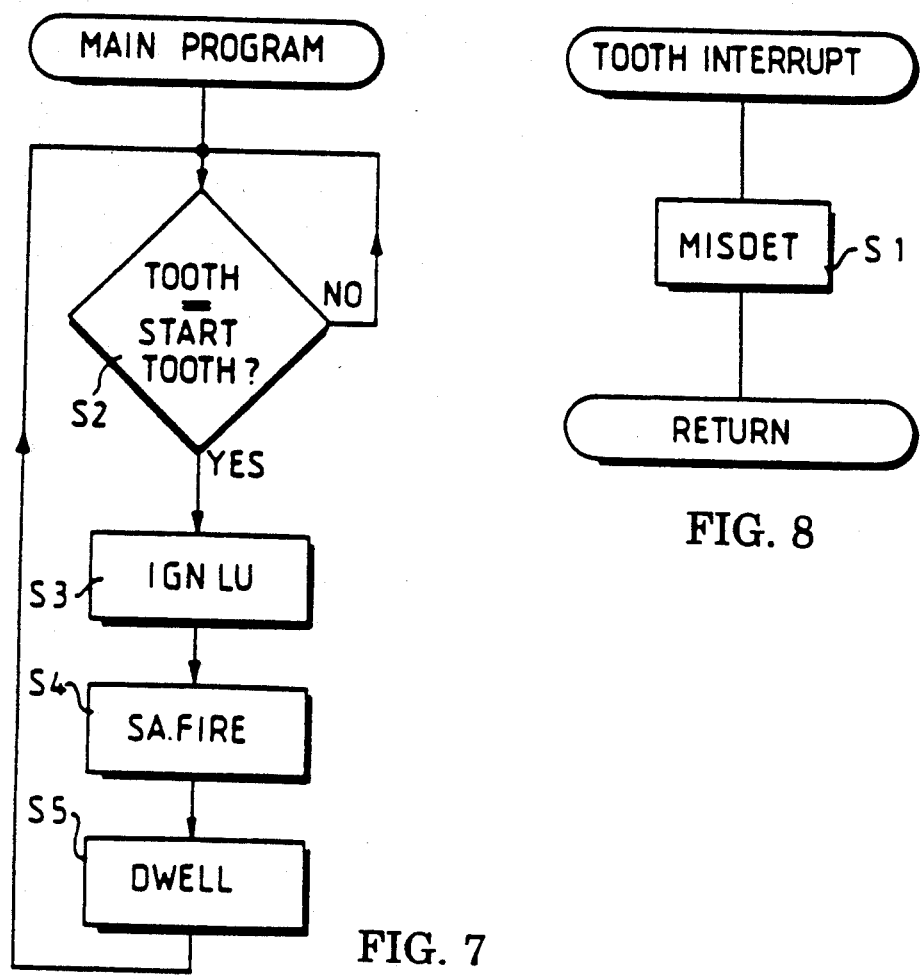
FIG. 8
FIG. 7

ADAPTIVE CONTROL SYSTEM FOR AN ENGINE

FIELD OF THE INVENTION

This invention relates to an adaptive control system for an internal combustion engine and further relates to a method of operating such an engine.

BACKGROUND OF THE INVENTION

In view of the increasing stringency of emission control regulations in various countries in recent years, many attempts have been made to improve fuel supply systems of engines to reduce noxious exhaust emissions while maintaining good engine driveability.

In one approach to reduce noxious emissions, fuel and air are supplied to the cylinders in stoichiometric proportions and the pollutants are removed by using a catalyst. With this approach, it is desirable to control the composition of the fuel mixture to the stoichiometric proportions for all engine operating conditions. If the mixture composition departs from these proportions, this may result in a deterioration of fuel economy or an increase in the pollutants which have to be removed by the catalyst.

In another approach to reducing noxious emissions, known as the "lean burn approach", a mixture containing excess air is supplied to the cylinders. Production of pollutants in the form of carbon monoxide and oxides of nitrogen is much less than with the stoichiometric approach. Also, an arrangement using this approach is less prone to deterioration with time than an arrangement using the stoichiometric approach and this approach results in an improvement in fuel consumption in comparison with the stoichiometric approach.

With the lean burn approach, as will now be explained, the mixture composition must be controlled carefully.

The formation of oxides of nitrogen is associated with high temperatures within the combustion chamber. The highest temperatures occur with mixtures whose composition is close to stoichiometric. Under these conditions, there is little free oxygen to participate in the formation of oxides of nitrogen. Therefore, the rate of formation of oxides of nitrogen is greatest with mixtures containing some excess air. Formation of oxides of nitrogen is reduced if the peak temperature during combustion is reduced by diluting the mixture either with excess air or with exhaust gas. Thus, either the air/fuel ratio or the amount of exhaust gas recirculated must be maintained above a predetermined minimum boundary to keep the generation of oxides of nitrogen within an acceptable level.

In a combustion chamber in a spark ignition engine, immediately after a spark has occurred, no measurable combustion pressure rise occurs while a flame kernel grows from the spark to a size at which the heat release produces rapid flame propagation. This initial period of kernel growth is often termed "the delay period". The period of rapid flame propagation shall hereinafter be referred to as "the combustion period".

During the combustion period, flame propagation occurs at a finite speed. It has been found that maximum efficiency occurs when the peak pressures are generated approximately 5° to 15° after a piston has passed the top dead center position. In order to achieve this, it is arranged that ignition occurs before the top dead center position.

As the mixture composition is made progressively leaner, the delay period increases and flame speed falls, thereby extending the combustion period.

In a spark ignition engine, the term "spark advance angle" is used to describe the angle, before the top dead center position, at which a spark occurs.

To keep the peak pressure position near the optimum value, the spark advance must be advanced further as the mixture is made linear. With very lean mixtures or with very high levels of exhaust gas recirculation, the delay and combustion periods are very long and the spark advance is very large. Consequently, the temperatures and pressures of the mixture at the moment of ignition are low and the rate of development of the flame kernel is also low. Small variations in the mixture composition and turbulence level can lead to large variations in the delay period which in turn leads to large variations in the total time to burn the mixture, as the combustion period can often be forced significantly into the expansion stroke of the piston.

These large variations in total burning time lead to similar variations in the cylinder pressure from cycle to cycle and so to unstable engine operation known as engine roughness. Additionally, a completely non-burning or partial burning cycle may occur where either the flame kernel does not develop, or the propagating flame is extinguished due to expansion of the cylinder volume. This leads to significant levels of emission of unburned hydrocarbons from the fuel.

Consequently, it is necessary to keep the air/fuel ratio or, where the exhaust gas is recirculated, the recirculation ratio of exhaust gas below a predetermined boundary beyond which roughness or emissions of unburned hydrocarbons become unacceptable.

Modern systems for controlling spark advance and mixture composition in an internal combustion engine make use of look-up tables stored in read only memories. These look up tables, which are also known as demand tables contain spark advance values and mixture composition values as a function of two different engine operating parameters such as engine speed and manifold pressure. These look up tables represent a considerable improvement on the mechanical devices which were used previously. However, they do not provide a completely adequate answer to emission and efficiency problems as there are many variables which they cannot take into account. These variables include changes in the accuracy of the operation of the equipment which controls the fuel mixture.

Various closed loop systems has been proposed to compensate for these variables.

In an article entitled "Electronic Spark Timing Control for Motor Vehicles" by Paul H. Schweizer and Thomas W. Collins, published by The Society of Automotive Engineers as SAE paper 780655, and also in U.S. Pat. No. 4,026,251, there is described a system for optimizing spark advance. In this system, small perturbations are superimposed on the spark advance and the resulting changes in engine speed are used to determine the differential or slope of engine speed with respect to spark advance angle. The spark advance is then adjusted until the slope is zero.

Although this system results in optimum spark advance and, consequently, optimum engine output torque, for the prevailing fuel mixture, it does not compensate for errors in mixture composition.

Another closed loop system uses an exhaust gas oxygen sensor. Unfortunately, such sensors have not proved to be accurate in use. Also, where exhaust gas is recirculated, an oxygen sensor cannot compensate for errors in the accuracy of the equipment responsible for the recirculation.

SUMMARY OF THE INVENTION

Accordingly, it is an object of this invention to provide a new or improved adaptive control system for an internal combustion engine and also a method of controlling such an engine which compensates for errors in the equipment controlling mixture composition.

According to one embodiment of this invention, there is provided an adaptive control system for a power producing engine which has at least two control inputs which affect an engine output. The system includes means for establishing a base value for a particular control input in accordance with engine operating conditions, and a perturbation means for periodically perturbing the particular control input about the base value. A slope determination means determines an actual slope of engine output with respect to the particular control input, and a control means controls a first control input and a second control input so as to cause the actual slope to correspond to a desired slope value. The system can include means for determining the desired slope value as a function of engine operating conditions. In one aspect of the invention, the control means can first modify the first control input within a given range to cause the actual slope to move closer to the desired slope value and then modify the second control input until the actual slope equals the desired slope value. The given range can be a predetermined percentage relative to a starting base value of the first control input. In another aspect, the control means can simultaneously modify the first control input and the second control input in accordance with a predetermined apportionment formula. The predetermined apportionment formula can be such that the first control input is modified by a predetermined proportion of the modification made to said second control input. The particular control input can be the same input as one of the first control input and the second control input or it can be a different control input from both the first control input and the second control input.

According to another embodiment of this invention, there is provided an adaptive control system for a power producing engine having at least two control inputs which affect an engine output, said system comprising a first means for establishing a first base value for a first control input as a function of engine operating conditions, second means for establishing a second base value for a second control input as a function of engine operating conditions, correction means for applying corrections in accordance with a predetermined control strategy to the first base value and the second base value to obtain a first corrected value for the first control input and a second corrected value for the second control input, perturbation means for periodically perturbing a control input, monitoring means for monitoring engine output, and slope detection means responsive to the monitoring means, for determining the actual slope of the engine output with respect to the perturbed control input, the control strategy being predetermined to cause the actual slope to correspond to a desired value. The system can further comprise means for modifying the first means and the second means after corrections have become stabilized to supply modified first base values and modified second base values, respectively, corresponding to prevailing engine operating conditions such that the correction means causes the actual slope to correspond more quickly to the desired slope.

Preferably, the system includes an ignition timing control device responsive to the first control input, a fuel mixture control device responsive to the second control input, and the perturbed control input is the first control input.

Applicants have found that ignition timing and mixture composition are related in the following way. For a particular engine, and for specified engine operating conditions, such as a specified value of engine speed and a specified value of manifold pressure, mixture composition is defined by a particular value of ignition timing and a particular value of the slope of engine output with respect to ignition timing. Between production engines, there are small but significant differences in the ignition timing and slope combinations which define a particular mixture composition. However, mixture composition itself is subject to relatively large variations between production engines. Thus, if ignition timing only is varied to achieve a desired value of the slope, as outlined in the above SAE paper, there is a risk that a large error in mixture composition will remain uncorrected. On the other hand, if the mixture composition alone is changed to achieve a desired value of the slope, this itself could cause an error in the mixture composition due to the differences in the combination of ignition timing and slope values occuring between production engines. By correcting both ignition timing and mixture composition in accordance with an appropriate control strategy, it is possible to maintain the errors in the mixture composition within acceptable limits.

In one example of the control strategy, the correction means applies corrections up to a predetermined maximum magnitude to one of the first and second base values and then applies corrections to the other of the base values. In another example of the control strategy, the correction means applies corrections simultaneously to both base values, the corrections being related to each other by a predetermined formula.

In another embodiment of the invention where the engine is a multi-cylinder engine, the system includes means for establishing a plurality of combinations of cylinders of the engine and for selecting each combination in turn, each combination including at least one cylinder, the means for applying corrections applies corrections on an individual basis to at least one of the first and second base values for each cylinder combination, the means for periodically perturbing the perturbed control input is arranged to perturb the perturbed control input for the selected cylinder combination, the means for determining the slope is arranged to determine the slope for the selected cylinder combination, and the control strategy is arranged to obtain a desired value of the slope for each cylinder combination.

The fuel mixture control device may control the air/fuel ratio or may be a device for controlling exhaust gas recirculation. The system may include means for detecting engine roughness, and means for overriding one of the corrected values in the event engine roughness exceeds a predetermined level.

According to another embodiment of the invention, there is provided a method of controlling a power producing engine having at least two control inputs which affect an engine output. The method includes (1) establishing a base value for a particular control input in accordance with engine operating conditions; (2) periodically perturbing the particular control input about the base value; (3) determining an actual slope of engine output with respect to the particular control input; and (4) controlling a first control input and a second control input so as to obtain a desired value of the slope.

According to yet another embodiment of this invention, there is provided a method of controlling a power producing engine having at least two control inputs which affect an engine output, said method comprising establishing a first base value for a first control input as a function of engine operating conditions, establishing a second base value for a second control input as a function of engine operating conditions, applying corrections in accordance with a predetermined control strategy to the first base value and the second base value to obtain first and second corrected values, periodically perturbing a control input, monitoring the engine output, and determining the actual slope of the engine output with respect to the perturbed control input, the control strategy being predetermined so as to obtain a desired value of the slope and to permit corrections to be applied to both base values after the corrections have become established.

According to a further embodiment of this invention, there is provided an adaptive control system for an internal combustion engine having at least two control inputs which affect an engine output, said system comprising means for establishing a base value for one of said control inputs as a function of engine operating conditions, means for periodically perturbing said one input about its base value, monitoring means for monitoring said engine output, means responsive to the monitoring means, for determining the actual slope of engine output with respect to said one input, means for establishing a desired value of the slope, comparison means for determining the difference between the actual slope value and the desired slope, and storage means, responsive to the comparison means, for storing information relating to said difference.

With this embodiment, the means for storing the information relating to the error may be interrogated at periodic intervals, for example, during a garage service. Where it is found that there are significant errors in the slope, this will indicate that there is a fault in the equipment which controls a mixture composition, and this fault can then be remedied.

The storage means can include a drift storage means for storing the difference between the actual slope and the desired slope value as a function of age of the engine, and can further include means, responsive to the drift storage means, for providing a correction to said one control input.

According to a still further embodiment of this invention, there is provided a method of controlling an internal combustion engine having at least two control inputs which affect an engine output, said method comprising establishing a base value for one of said control inputs as a function of engine operating conditions, periodically perturbing said one input about a base value, monitoring engine output, determining the actual slope of engine output with respect to said one input, establishing a desired value of the slope, determining the error between the actual slope value and the desired slope value, and storing information relating to said error.

According to yet another embodiment of the invention, there is provided an adaptive control system for an internal combustion engine having at least two control inputs which affect an engine output. The system includes a position transducer for generating crankshaft position signals, a load demand transducer for generating an output representing load demand on the engine, and a speed calculation device, responsive to the position transducer, for providing an output representing engine speed. A first memory means stores data representing a first control input as a function of engine speed and load demand, and responsive to the output from the speed calculated device and the load demand transducer, provides an uncorrected output for the first control input at prevailing engine speed and load demand conditions. A second memory means stores data representing a second control input as a function of engine speed and load demand, and responsive to the output from the speed calculation device and the load demand transducer, provides an uncorrected output for the second control input at prevailing engine speed and load demand conditions.

A perturbation means applies a perturbation signal to a particular control input, and a slope detection means, responsive to the position transducer, determines an actual slope of the engine output relative to the particular control input. A third memory means stores data representing a desired slope or differential of the engine output relative to the particular control input as a function of engine speed and load demand, and responsive to the output from the speed calculation device and the load demand transducer, provides a desired slope for the engine output relative to the particular control input. An error detection means, responsive to the output of the third memory means and the slope detection means, compares, the desired slope and the actual slope and provides a slope error output having a magnitude and sign representing a compared relationship between the desired slope and the actual slope. A controller means, responsive to the error detection means, apportions the slope error output into a first output and a second output. A correction means sums the first output and the uncorrected output from the first memory means to obtain a corrected output for the first control input and sums the second output and the uncorrected output from the second memory means to obtain a corrected output for the second control input so that the magnitude of the slope error output is zero. The desired slope can be zero or a non-zero value. In one arrangement of this embodiment, the system can comprise an ignition timing control means responsive to the first control input and a fuel mixture control means responsive to the second control input, and the particular control input can be the first control input.

The controller means can apportion the slope error output such that one of the first output and the second output has a value less than or equal to a predetermined maximum magnitude, with the correction means (1) first summing the one of the first output and the second output with the corresponding one of the uncorrected output from the first memory means and the second memory means to provide a corrected value for the corresponding one of the first control input and the second control input and (2) thereafter summing the other of the first output and the second output with the corresponding one of the uncorrected output from the first memory means and the second memory means to provide a corrected value for the corresponding one of the first control input and the second control input.

The controller means can alternatively apportion the slope error output such that the first output and the second output are related to each other by a predetermined formula, with the correction means simultaneously (1) summing the first output and the uncorrected output from the first memory means to obtain a corrected output for the first control input and (2) summing the second output and the uncorrected output from the second memory means to obtain a corrected output for the second control input.

In another arrangement of this last embodiment, the engine can be a multi-cylinder engine, and the control system can further comprising means for establishing a plurality of combinations of cylinders of the engine, with each combination including at least one cylinder, and means for selecting each combination in turn. The correction means sums individually for each cylinder combination the first output and the uncorrected output from the first memory means to obtain a corrected output for the first control input and the second output and the uncorrected output from the second memory means to obtain a corrected output for the second control input. The perturbation means supplies the perturbation signal to the particular control input for each cylinder combination when it is selected, and the slope detection means determines the actual slope of the engine output relative to the particular control input for each cylinder combination when selected.

According to another arrangement of this last embodiment, the second control input can be a fuel control input, and the control system can further comprise an averaging circuit and a common fuel mixture control means for each cylinder. The correction means provides to the averaging circuit a sum of a second output and the uncorrected output from the second memory means for each cylinder combination when selected, and the averaging circuit provides an average output to the common fuel mixture control device.

According to another arrangement of this last embodiment, the second control input can be a fuel control input, and the control system can further comprise a common fuel mixture control means for each cylinder. A selection means selects a particular corrected output for the second control input provided by the correction means for each cylinder combination when selected by the cylinder selection means which constitutes one of a leanest and a richest fuel demand output and provides the particular corrected output to the common fuel mixture control means.

BRIEF DESCRIPTION OF THE DRAWINGS

The above objects, advantages and features of the invention will be more fully apparent from the following description when considered in conjunction with the attached drawings, of which:

FIG. 5 is a block diagram of a microcomputer system for implementing the functional components of FIG. 1;

FIGS. 7 and 8 are flow charts of the program; and

DETAILED DESCRIPTION OF THE INVENTION

At the outset, it is noted that U.S. Ser. No. 888,067 filed July 22, 1986 and U.S. Ser. No. 016,790 filed Feb. 20, 1987 are related applications, of which are incorporated herein by reference.

Figure 2:
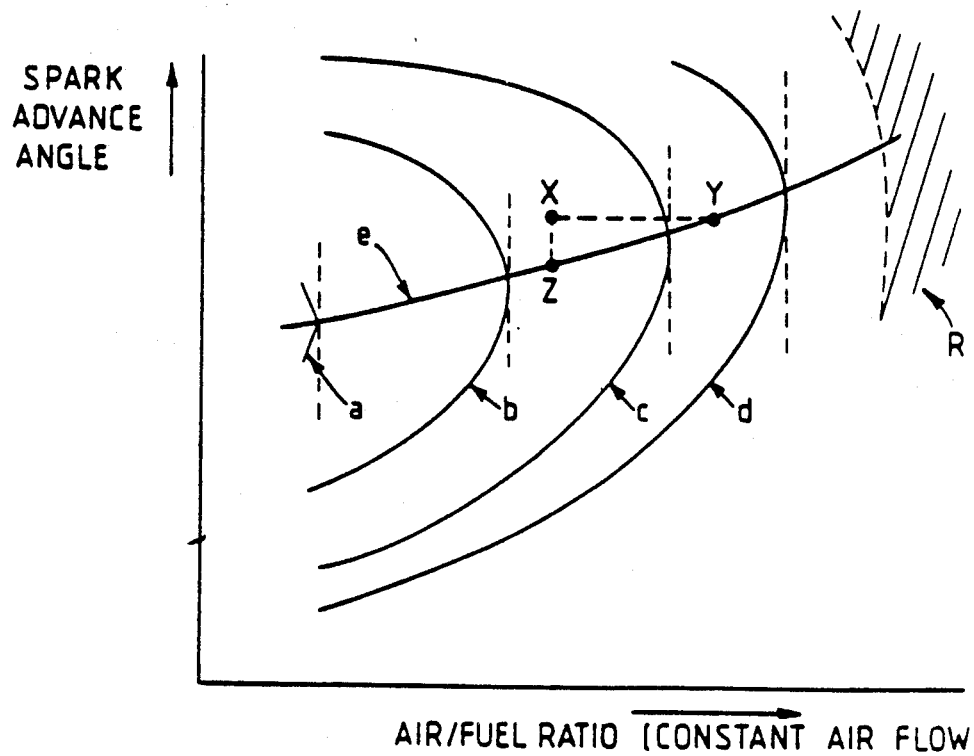
FIG. 2 is a graph in which the spark advance angle required to give particular levels of torque is plotted against air/fuel ratio.

FIG. 2 shows how the performance of a spark ignition engine can be characterized to provide information to enable feed-back control of ignition timing in the form of spark advance angle or mixture composition in the form of air/fuel ratio. FIG. 2 shows graphs in which the spark advance angles required to give particular levels of torque are plotted against air/fuel ratio.

These curves are obtained by running an engine on a test bench at a specific speed and air supply rate and measuring the torque obtained for different levels of spark advance angle and air/fuel ratio. The engine is run with the air flow and spark advance angle set to specific values. The fuel setting of the engine and the braking load on the engine are adjusted until a specific fuel flow and engine speed are obtained. The torque is then noted.

Points at which one particular level of torque is obtained are joined to provide the isotorque curve d. Similarly, isotorque curves c, b and a can be drawn for further successively higher levels of torque.

At any point in FIG. 2, there is a slope vector which points in the direction which produces a maximum increase in torque. Everywhere along an isotorque curve the slope vector is at right angles to the curve, since travel along the isotorque curve produces no change in torque. Hence, the points at which the isotorque curves are parallel to the spark advance axis are points at which there is no component of the slope vector in the spark advance direction. The partial differential of torque with respect to spark advance angle is therefore zero at these points and these points have been joined by line e on FIG. 2. The same procedure is repeated for each combination of values of air flow rate and speed. It has been found by the Applicants that the family of lines e thus derived is characteristic of the engine being tested.

Thus, for a specific engine speed and a specific air flow rate, line e represents a function relating spark advance angle to air/fuel ratio. Thus, using line e, each value or air/fuel ratio is defined by a specific spark advance angle.

At each point not on line e, the partial differential or slope of engine torque with respect to spark advance angle will have a non-zero value. Using the points away from line e, a specific air/fuel ratio can be defined by a specific spark advance value together with the associated value of the slope of engine torque with respect to ignition timing.

At lean air/fuel ratios, combustion in a spark ignition engine becomes excessively slow with large variations in burning time between firing cycles. This is known as engine roughness. Regions of engine roughness are shown in FIG. 2 by the hatched lines marked by arrow R.

Although not shown, there are also regions of air/fuel ratio and spark advance angle at which knock can occur and which should be avoided. In regions where knock can occur, the slope is usually negative.

At points anywhere in FIG. 2 above and to the left of line e, the slope of engine torque with respect to spark advance angle is negative. Below and to the right of line e, the slope is positive. The area below and to the right of curve e in FIG. 2 represents fuel mixtures where the combustion period occurs too late in the cycle to make the maximum possible contribution to the work output of the engine. The area above and to the left of curve e in FIG. 2 represents fuel mixtures where the combustion period occurs too early in the cycle to make the maximum contribution. As noted above, this area also includes regions where knock might be expected.

While the engine is being tested to produce the curves shown in FIG. 2, the maximum of pollutants, especially nitrogen oxides, are also measured.

Using the results of these tests, for each engine speed and air flow rate, an optimum combination of spark advance angle and air/fuel ratio may be selected. The air/fuel ratio is selected so that the mixture is lean enough to prevent generation of excessive amounts of nitrogen oxides but sufficiently rich to avoid the region of engine roughness. Normally, the spark advance angle is a point on curve e since such angles correspond to maximum torque output. However, under certain conditions, a point away from curve e will be chosen. For example, during idling, it may be desired to retard the spark advance angle so as to reduce the emission of unburned hydrocarbons. At each of these selected combinations of spark advance angle and air/fuel ratio, the slope of engine output with respect to spark advance angle is noted.

Similar curves to those shown in FIG. 2 can also be obtained relating exhaust gas recirculation to spark advance angle at constant fuel/air ratio. At high levels of exhaust gas recirculation, engine roughness can also occur due to excessively slow combustion, and such roughness could be monitored and shown on the curves. Such curves could be used to show optimum combinations of exhaust gas recirculation and spark advance angle. Although FIG. 2 will now be discussed in relation to controlling spark advance angle and air/fuel ratio, it is to be appreciated that a similar discussion could be made in relation to controlling spark advance angle and exhaust gas recirculation.

FIG. 2 and similar graphs for different engine speeds and air flow rate define the combination characteristics of a spark ignition engine. From considering FIG. 2, two approaches to engine control can be identified.

In the first approach, the spark advance angle is controlled to give zero slope and whatever fuel mixture is supplied to the engine is accepted. This approach gives the best torque for that fuel mixture. By way of refinement, the spark advance angle can be controlled to give a non-zero slope value, preferably retarding the spark advance angle from the optimum to reduce emissions of nitrogen oxides and hydrocarbons and the risk of knock occurring. This approach is described in previously mentioned U.S. Pat. No. 4,026,251, incorporated herein by reference.

In the second approach, the spark advance angle is fixed and the air/fuel ratio is controlled so as to achieve zero slope or, by way of refinement, a non-zero slope value.

The effect of these two approaches on compensating errors in fueling will be discussed shortly. In the meantime, differences in the combustion process between production engines and also the effect of spark advance angle and air/fuel ratio on emissions of nitrogen oxides will be discussed.

Figure 4:
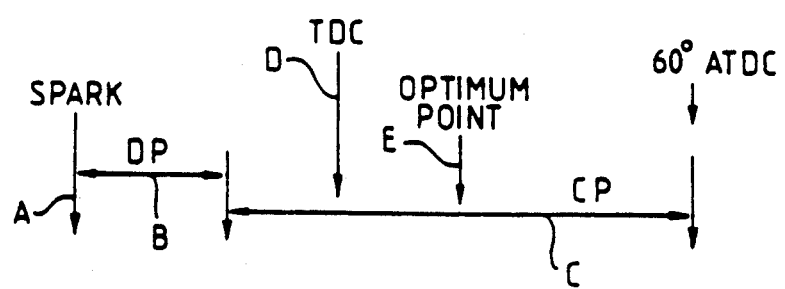
FIG. 4 illustrates the delay and combustion periods in the chamber of a spark ignition engine.

Referring to FIG. 4, the combustion process can be thought of as consisting of two periods. Immediately after the spark, there is a delay period (DP) where no measurable heat release takes place but a flame kernel grows to a size capable of rapid propagation. The subsequent combustion period (CP) is that of visible flame propagation across the combustion chamber. In order to obtain maximum torque output, there is an optimum point for the middle of the combustion period. In a typical engine, a spark may occur at 35° before top dead center (TDC), the delay period may last for 20° of crankshaft rotation, the combustion period may last for 60° of crankshaft rotation, and the optimum point for the middle of the combustion period may be 15° after top dead center. In FIG. 4, the spark, delay period, combustion period, top dead center, and the optimum point are indicated respectively by arrows A to E.

Both the delay period and the combustion period are affected by differences between production engines and also changes which occur during the life of an engine. Of these two periods, the delay period is more strongly affected.

Differences between production engines include differences in compression ratio and value timing which are permitted by production tolerances. Further changes may occur in the compression ratio and valve timing during the engine life due to engine wear and the build-up of combustion chamber deposits. In addition to compression ratio and valve timing effects, ignition quality will also affect the delay period and the combustion period. Ignition quality may change due to variations in spark plug gap size, condition or orientation, or the ignition energy produced by the coil and its associated drive circuit. The conduction of the high tension leads may also affect the energy delivered to the spark plug and ignition quality can also be affected by variation in the exhaust gas recirculation level, or the use of spark-aiding gasoline additives.

Figure 3A:
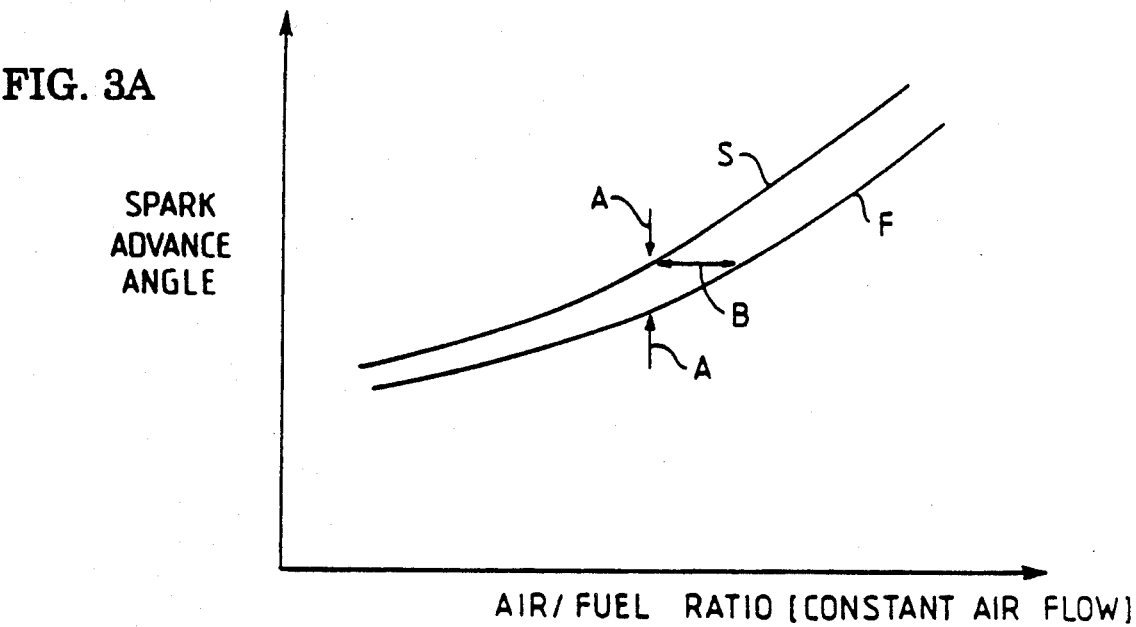
FIG. 3A is a graph showing the variation in optimum spark advance angle between production engines.

These changes in the sum of the delay period and the combustion period result in movement of the line e as shown in FIG. 3A. An engine in which the sum of the delay and combustion periods is shorter than in a normal engine may be called a "fast burn" engine and an engine in which the sum of these periods is longer than in a normal engine may be termed a "slow burn" engine. In FIG. 3A, curves for fast and slow burn engines are indicated respectively by F and S. As may be clearly seen in FIG. 3A, for a particular air/fuel ratio, there is a difference indicated by arrows A between the optimum spark advance angles. If the air/fuel ratio is controlled in the two engines to achieve zero slope at the same spark advance angle, this will result in a difference in the air/fuel ratio as indicated by arrow B.

Figure 3B:
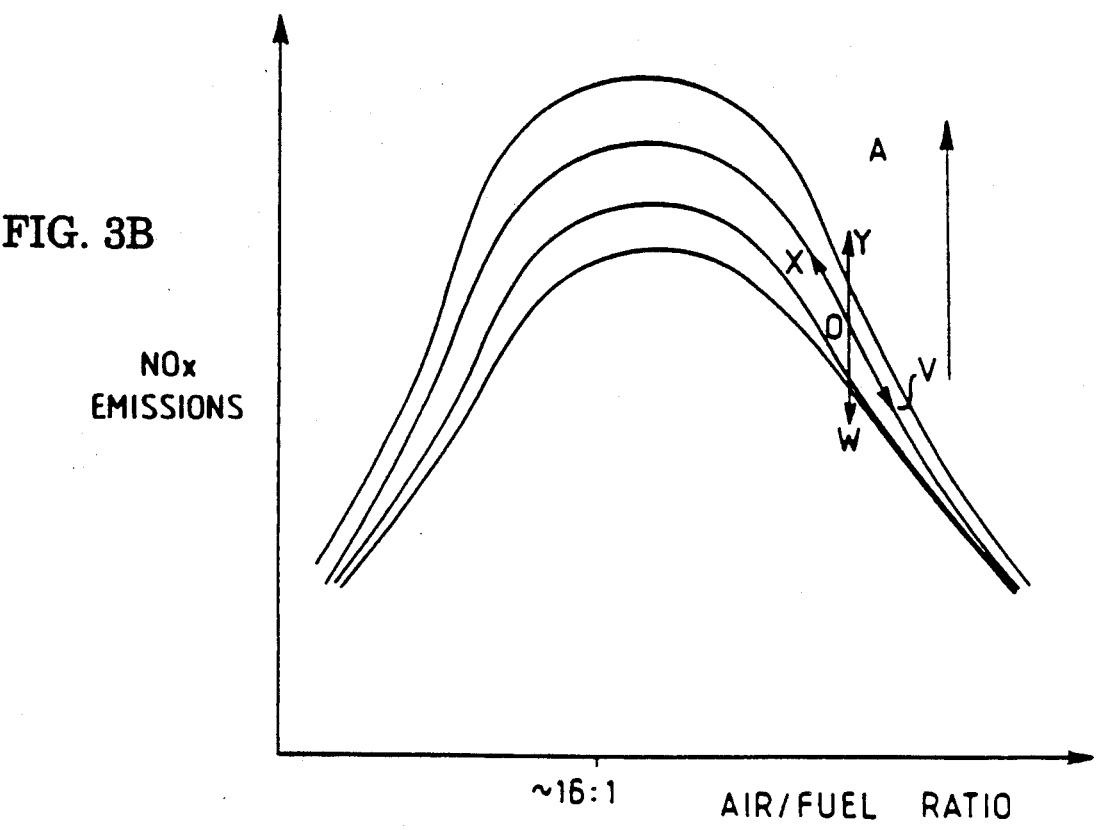
FIG. 3B shows how spark advance and air/fuel ratio affect emissions of nitrogen oxides.

The variation of emissions of nitrogen oxide is shown for four distinct spark advance angles in FIG. 3B. In this figure, the ordinate represents emissions of nitrogen oxides, the abscissa represents the air/fuel ratio, and the direction of increasing spark advance angle is indicated by arrow A. As may be seen, the maximum emissions occur at an air/fuel ratio of about 16:1 and the emissions increase with increasing spark advance angle. In a fast burn engine, the early combustion will cause the emissions of nitrogen oxides to be greater than the design target, and in a slow burn engine the emissions will be less than the design target.

The effect of the first approach mentioned above will now be considered in relation to correcting errors in the air/fuel ratio. As will be recalled, in the first approach, the spark advance angle is controlled so as to achieve a desired value of the slope of engine output with respect to spark advance angle and, for simplicity, the case will be considered where the spark advance angle is varied to achieve zero slope.

This first approach may be considered initially in relation to a normal burn engine. Referring to FIG. 2, it may be desired to operate an engine at point Y but, owing to an error in the fueling, the engine is operating at point X. With this first approach, the spark advance angle will be varied until the engine is operating at point Z on line e. Thus, although the engine torque is maximized for the actual air/fuel ratio, the error in the air/fuel ratio is not corrected. Consequently, the generation of nitrogen oxides will be greater than the design target and the error in the air/fuel ratio is likely to lead to a deterioration in fuel economy. Also, the output torque will differ from the design target and so the engine will not operate in the same manner that was intended.

Errors in the air/fuel ratio in the lean direction may lead to engine roughness. The first approach may now be considered in relation to an engine in which the sum of the delay and combustion periods is abnormal.

With a first burn or a slow burn engine, errors in air/fuel ratio will still not be corrected. However, with a fast burn engine, the spark advance angle will be decreased thereby reducing the emissions of nitrogen oxides. This reduction in emissions of nitrogen oxides will occur both with engines operating on the lean side and the rich side of air/fuel ratio which produces maximum emissions. On the lean side, the spark advance angle may move, for example, from point O to point W in FIG. 3b. This will provide compensation for the increase which is caused by the engine being a fast burn engine. If the engine is a slow burn engine, the spark advance angle will be increased thereby increasing the emissions of nitrogen oxides. This increase in emissions of nitrogen oxides will occur both with the engine operating on the lean side and the rich side of the air/fuel ratio which produces maximum emissions. On the lean side, the spark advance angle may vary, for example, from point O to point Y. This will tend to remove the reduction in emissions since the engine is a slow burn engine. Therefore, controlling spark advance will correct the variation of nitrogen oxides emissions which is caused by engine differences.

The second approach will now be considered in which the air/fuel ratio is controlled so as to achieve a target slope. For simplicity, the case will be considered where the air/fuel ratio is controlled so as to achieve zero slope.

Referring again to FIG. 2, with a normal burn engine, it may be desired to operate at point Y but, owing to an error in the fueling, the engine is operating at point X. With this approach, the air/fuel ratio will be controlled until the engine is operating at point Y, and thus the error in the fueling will be fully corrected.

Considering now FIG. 3A, an engine may be designed so as to operate along a curve which is positioned mid-way between the curves S and F. However, with a slow burn engine, the air/fuel ratio will be controlled so that the engine operates along curve S and, with a fast burn engine, it will be controlled so that the engine operates along curve F. Consequently, for both engines, the air/fuel ratio will depart significantly from the design curve. This may cause the fuel economy to differ from the design target and differences between the actual torque and the design torque will mean that the engine will not operate in the manner in which it was designed.

The effect of the second approach on the emissions of nitrogen oxides will now be considered. Initially, the case will be considered where the engine is operating on the lean side of the air/fuel ratio which produces maximum emissions of nitrogen oxides. With a fast burn engine, the air/fuel ratio will be increased thereby reducing the emissions of nitrogen oxides. For example, the air/fuel ratio may move from point O to point V. This will compensate for the increase in emissions caused by the engine being a fast burn engine. If the engine is a slow burn engine, the air/fuel ratio will be decreased thereby increasing the emissions of nitrogen oxides. For example, the air/fuel ratio might move from point O to point X. This will remove the reduction in emissions of nitrogen oxides caused by the engine being a slow burn engine.

The case will now be considered where the engine is operating on the rich side of the air/fuel ratio which causes maximum emissions of nitrogen oxides. With a first burn engine, the air/fuel ratio will again be increased. This increase in the air/fuel ratio will increase the emissions of nitrogen oxides and this increase will be in addition to the increase caused by the engine being a fast burn engine. Thus, there will be a severe deterioration in the emissions. In the case of a slow burn engine, the emissions will reduce and this reduction will be in addition to the reduction caused by the engine being a slow burn engine.

In passing, it is of interest to note the two worst case combinations which can occur in an engine which operates on the lean side of the air/fuel ratio which gives maximum emissions of nitrogen oxides and in which neither spark advance angle nor air/fuel ratio are controlled in accordance with the slope. In such an engine, the combination of a rich fueling error and a fast burn engine can cause high nitrogen oxide emissions, and the combination of a lean fueling error and a slow burn engine can cause high engine roughness.

Thus, neither of the two approaches set out above provides an entirely satisfactory solution to correcting errors in the air/fuel ratio. Applicants have found that a much more satisfactory solution can be achieved by controlling both the spark advance angle and the air/fuel ratio in accordance with a particular control strategy so as to achieve a particular slope. More specifically, Applicants have proposed two methods for doing this and these will now be discussed.

In the first method, characteristics of the type shown in FIG. 2 are made for a series of production engines which collectively exhibit the range of tolerances found in such engines. Specifically, for a given air/fuel ratio, air/flow rate and engine speed, the range of spark advance values which achieve a given slope (usually zero) is determined. For current manufacturing techniques, the applicants had found that this range extends by 3° of spark advance angle on each side of the average value. With improved production techniques, this range may become smaller.

In this first method, when there is an error in the slope, the spark advance angle is controlled first within this range or window so as to cause the actual slope to approach the target slope. When the spark advance angle reaches one of the limits of this window, the air/fuel ratio is controlled until the actual and target slope angles are equal.

For present production engines, applications have found that movement along a curve e as shown in FIG. 2 by an amount corresponding to 3° of spark advance angle corresponds approximately to a change in the air/fuel ratio of one unit. Thus, if the spark advance angle is constrained to move by up to 3° from its middle value, for a normal burn engine, the air/fuel ratio may be in error by up to one unit but the ignition timing will be optimized for that fueling value. This error is considered acceptable and all the worst case conditions discussed above will be avoided, as only lean errors will occur on a fast burn engine and only rich errors will occur on a slow burn engine.

In a second method for the control strategy, the slope error is apportioned simultaneously to both the spark advance angle and the air/fuel ratio using a relatively low value of control gain. It is appropriate to divide the slope error between the spark advance angle and the air/fuel ratio so that the overall control is in a direction perpendicular to the slope contour. With zero slope, this would result in the controlled direction being perpendicular to line e.

From slope characteristics, the applicants have found that a suitable formula for apportioning of the slope is to move the spark advance angle in the ratio of 3° for each unit of movement of the air/fuel ratio. As is evident from inspecting FIG. 2, this ratio is not constant and will depend upon the target air/fuel ratio. To maintain an overall direction of movement perpendicular to the slope contour, the amount of control of the spark advance angle will be greater with rich fueling than with leaner fueling. It can be appreciated that other ratios for apportioning the slope error may be chosen so as to follow any desired control trajectories on the spark advance and air/fuel ratio axes shown on FIG. 3A.

Figure 3C:
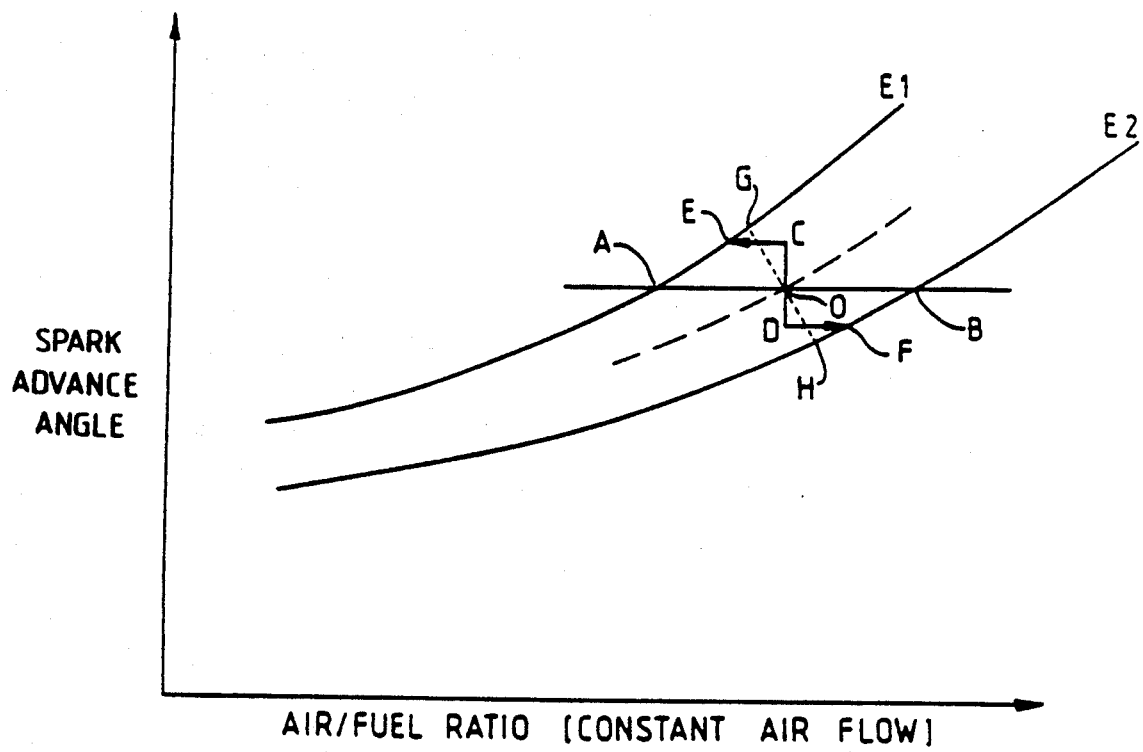
FIG. 3C illustrates two control strategies used in the control system of FIG. 1.

FIG. 3c illustrates the advantages of the two methods of a combined control strategy on fast and slow burn engines. In FIG. 3c curves E1 and E2 correspond respectively to curve e of FIG. 2 for slow and fast burn engines. With a control system which varies only the air/fuel ratio and in which point O represents the design target, points A and B represent respectively the air/fuel ratios which would be set for the slow burn and fast burn engines. With combined spark advance and air/fuel ratio control according to the first method set out above, for a slow burn engine the spark advance angle will be controlled from O to C and the air/fuel ratio will then be controlled from C to E. For a first burn engine, the control trajectory will move from O to D and from D to F. Using the second method set out above, for a slow burn engine, the control trajectory will move from point O to G and, for a fast burn engine, the control trajectory will move from O to H.

With both of these methods, the emissions of nitrogen oxides will be close to the design target. In addition, the fuel consumption and torque will be much nearer to the design target than is achieved when only the air/fuel ratio is controlled.

After the corrections have become established, both these methods for the control strategy will permit correction to be applied to both the spark advance angle and the air/fuel ratio.

In the discussion of FIGS. 2 to 4 above, spark advance angle is used to control the point at which combustion occurs and thereby to control ignition timing. This is appropriate in a spark ignition engine. In a diesel engine, injector timing is used to control the start of combustion and thereby to control ignition timing.

The discussion of FIGS. 2 to 4 above has been based mainly on controlling the mixture composition by controlling the air/fuel ratio. As mentioned briefly, fuel mixture can also be controlled by controlling recirculation of exhaust gas and many of the comments above which have been made in relation to air/fuel ratio could equally be made in relation to exhaust gas recirculation ratio.

In the discussion of FIG. 2, engine torque is used as a parameter to define engine output. Engine output can also be defined by engine speed or engine power and, in the various embodiments of the present invention which will be discussed below, engine speed is used.

In the discussion of FIGS. 2 to 4 above, the spark advance angle has been discussed as a function of air/fuel ratio at constant air flow. As explained above, for each engine speed and air flow, using the appropriate curve e, an optimum spark advance angle and air/fuel ratio may be selected. Air flow represents a parameter which defines the load demand to which the engine is subjected. Fuel flow, mixture flow, throttle angle or inlet manifold pressure may also be used to define load demand. In the embodiments of this invention given below, the manifold pressure is used.

Figure 1:
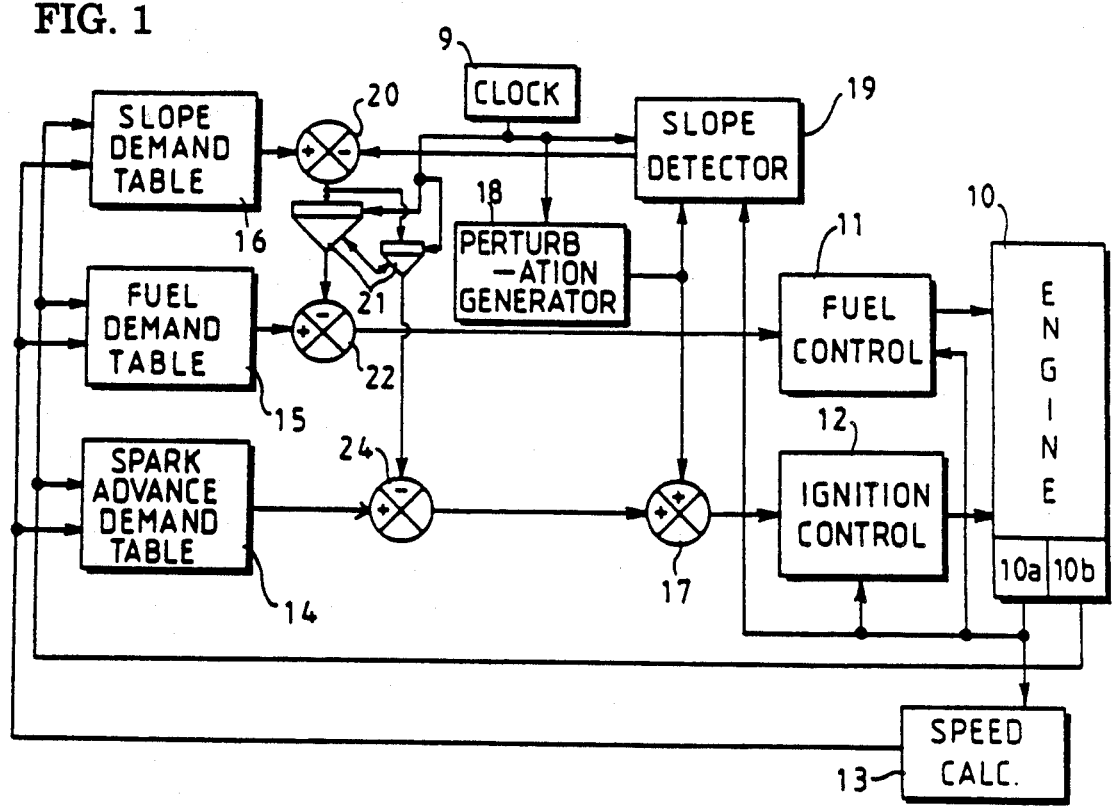
FIG. 1 is a diagram of the functional components of an adaptive control system according to one embodiment of this invention.

Referring now to FIG. 1, there is shown the functional components of an adaptive control system according to one embodiment of this invention and which uses the combined control strategy discussed above.

An engine 10 has an electronic fuel control device 11. The device 11 is an electronic fuel injection control device of known type in which a separate injector for each cylinder is arranged to inject fuel into the branch of the air intake manifold leading to that cylinder. Injection is initiated at a specific point in the operating cycle of the engine and fuel control device 11 receives a fuel quantity input signal which determines the duration of injector opening in each cycle.

Engine 10 has an ignition control device 12, which, in well known manner, causes the individual spark plugs to the engine to be fired at crankshaft angles determined by a spark advance angle input signal to control device 12.

Engine 10 has a crankshaft position transducer 10a and another transducer 10b which measures the air intake manifold pressure as a parameter representing load demand. Alternatively, a transducer 10b could measure another parameter representing load demand such as throttle angle. The latter parameter would be more appropriate than manifold pressure to a system controlling exhaust gas recirculation. In this case the fuel demand table 15 and the fuel control 11 shown in FIG. 1 would be replaced by an exhaust gas recirculation demand table and exhaust gas recirculation control respectively. Fueling control would be carried out by a further independent system which may take the form of a conventional mechanical carburetor or known type of fuel injection system. Crankshaft position transducer 10a is a pick-up which coacts with the toothed wheel on the crankshaft. An arrangement is incorporated to enable a datum position of the crankshaft to be recognized. Such an arrangement may be constituted by a circuit or a computer program to recognize a missing tooth position on the toothed wheel. A suitable arrangement is disclosed in G.B. Patent No. 2,142,436, incorporated herein by reference. The crankshaft position signals derived from transducer 10a are supplied to both the fuel and ignition control devices 11 and 12 to enable the fuel injection and ignition operations to be properly synchronized with engine operation.

The speed signal and the manifold pressure signal are supplied to three look up tables 14, 15, 16. Table 14 provides The crankshaft 13 which provides a frequently updated signal representing the current speed of the crank shaft: output data representing spark advance angle for the current value of engine speed and manifold pressure. Table 15 provides output data representing air/fuel ratio for the current values of engine speed and manifold pressure.

The data stored in look up tables 14 and 15 are selected during a rig test on a particular engine using the principles discussed above in relation to FIG. 2. Look up table 16 contains the desired slope value for each engine speed and manifold pressure combination. For each combination, table 16 outputs the desired value of slope of engine speed with respect to spark advance angle which corresponds to the selected values of spark advance angle and air/fuel ratio determined during the rig test on the particular engine. For most combinations of values of speed and manifold pressure, the desired value of the slope is zero. But, as explained above, in some operating conditions such as idling, a positive slope is required for minimum emissions.

The spark advance signal (or word) from look up table 14 is supplied to ignition control device 12 via a summer 24 and a summer 17. Summer 17 receives a perturbation signal from a perturbation generator 18 which also has an input from a clock 9. The air/fuel ratio signal is supplied via a summer 22 to fuel control device 11.

The perturbation signal is alternately positive and negative, and hence the spark advance signal supplied to ignition control device 12 is varied periodically to advance and retard the spark advance angle by a small amount.

The perturbation signal is also supplied together with a signal from transducer 10a and clock 9 to a slope detector 19. Detector 19 operates to monitor the effect of the perturbation in spark advance angle on engine speed. Thus, it produces a signal corresponding to the actually detected value of the slope of engine speed with respect to spark advance angle. This signal is supplied to an error detector 20 which compares the actual value of the slope with a desired value derived from look up table 16. The resulting error signal varies in both magnitude and sign in accordance with the relationship between the desired and actual values of the slope.

The error signal is supplied to the controller 21 which has an integrator transfer function. Controller 21 has two outputs which are connected respectively to negative inputs of summers 22 and 24. Controller 21 consists of two sections which may linked as shown and thereby apportion the slope error between summers 22 and 24. The error can be apportioned in either of the two methods discussed above and illustrated in FIG. 3c. The resulting outputs of summers 22 and 24 represent respectively a corrected air/fuel ration demand signal and corrected spark advance demand signal.

It will be appreciated that other transfer functions for controller 21 could be used. For example, proportional, integral or derivative transfer functions or any combinations of these may be used so as to increase the speed or stability of the control loop. The controller need not have the two sections linked.

When the control strategy is based on the second method discussed above, that is with the corrections being apportioned to the spark advance angle and air/fuel ratio in a predetermined ratio, this ratio itself may be made a function of engine speed and load demand. This ratio could be set in a further look up table.

The functional components shown in FIG. 1 may be implemented with a microcomputer system as shown in FIG. 5. Look up tables 14, 15, and 16 are readily implemented using a RAM while perturbation generator 18 is times by a software counter. Slope detector 19 calculates the slope by reference to successive measurements of engine speed stored in RASM. Controller 21 is implemented by an air/fuel ratio correction table and a spark advance correction table and also by a table for apportioning the error between the two correction tables. These three tables are stored in RAM and locations in the two correction tables corresponding to the prevailing speed and load conditions are repeatedly updated using digital proportional, integral and derivative algorithms in accordance with the error between the demanded slope and the actual slope in accordance with the error apportionment table. The output from perturbation generator 18 is added to data words from the fixed spark advance schedule and the spark advance correction table to obtain a command data work for the spark advance angle and data words from the fixed air/fuel ratio table and the air/fuel ratio correction table are added to obtain a command data word for the air/fuel ratio.

As shown in FIG. 5, the microcomputer system comprises a microcomputer 30 which forms part of an Intel type 8097 microcomputer and which is connected conventionally to a program memory 31 (ROM type 27C 64) which contains the program required for the microcomputer and look up tables 14, 15 and 16. Temporary variables are stored in RAM 32 (Hitachi type 6116).

Transducer 10a is as described in G.B. Patent No. 2,142,436, incorporated by reference herein, and employs a toothed wheel having teeth at 10° intervals with a tooth missing at each of two reference locations 180° apart. The winding of transducer 10a is interfaced with the interrupt input I of microcomputer 30 via an interface circuit 33 which operates mainly to filter out noise and provide clean squared pulses to the microcomputer input as each tooth passes the pick up winding. As explained in said G.B. Patent No. 2,142,436, these pulses are used to provide crankshaft position pulses at 10° intervals and reference pulses at two specific positions in each crankshaft revolution. Microcomputer 30 uses these pulses to calculate the engine speed and thereby performs the function of speed calculator 13. Transducer 10b is interfaced by an analog to digital converter 34 to microcomputer 30. Converter 34 also forms part of said Intel integrated circuit type 8097.

A high speed output of computer 30 is connected to an ignition driver 35. Driver 35 includes an amplifier and provides the current to drive the ignition coil on and off. Another high speed output is connected to another driver 36 which supplies control signals for the individual fuel injectors. Since the teeth on the toothed wheel are positioned at 10° intervals, finer resolution is obtained by interpolation. For each interval, the interpolation is achieved by using the time taken for the passage of the previous 10° interval.

Figure 6:
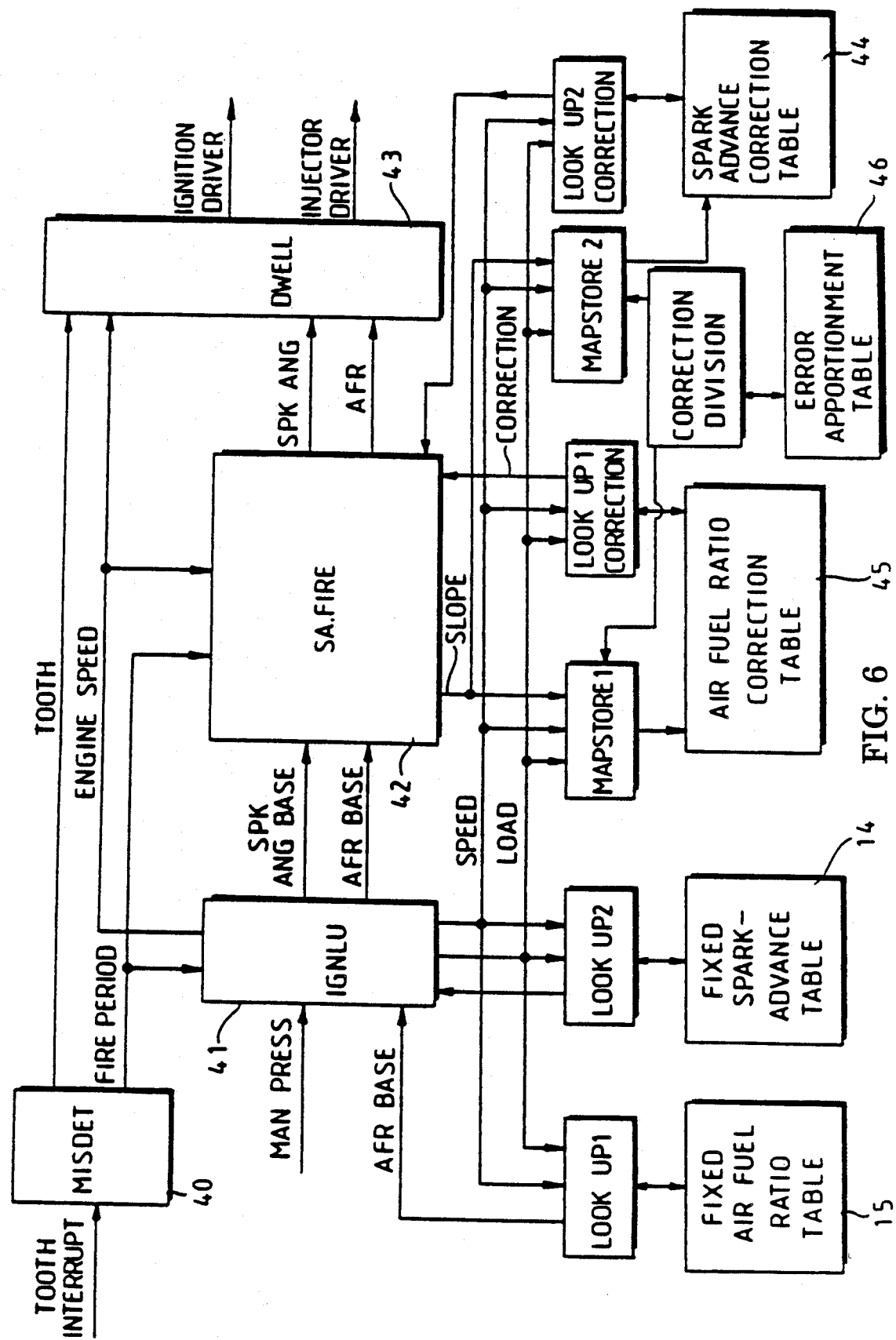
FIG. 6 is a layout diagram of the computer program for the microcomputer system of FIG. 5.

Referring to FIG. 6, there is shown a general arrangement of the modules which form the program and also the flow of data between these modules and the look up tables. The program comprises of modules MISDET 40, IGNLU 41, SAFIRE 42, and DWELL 43. The module IGNLU calls sub-modules LOOK UP 1 and LOOK UP 2, and the module SAFIRE calls sub-modules MAPSTORE 1, MAPSTORE 2, CORRECTION DIVISION, LOOK UP 1 CORRECTON and LOOK UP 2 CORRECTION. FIG. 6 also shows fixed sparked advance table 14, fixed air/fuel ratio table 15, together with spark advance correction table 44, air/fuel ratio correction table 45, and error apportionment table 46.

Correction tables 44 and 45 are updated under the control respectively of sub-modules MAPSTORE 2 and MAPSTORE 1 using a digital integral algorithm in accordance with the error between the demanded and actual slope and the sub-module CORRECTION DIVISION and the error apportionment table 46. The values stored in correction tables 44 and 45 are used respectively to control the spark advance angle and the air/fuel ratio under the respective control of the sub-modules LOOK UP 2 CORRECTION and LOOK UP 1 CORRECTION. Thus, these five sub-modules called by SAFIRE together with the two correction tables 44 and 45 and error apportionment table 46 perform the function of controller 21 shown in FIG. 1.

The module MISDET receives an interrupt signal TOOTH INTERRUPT and this module is executed each time a tooth is detected. A variable TOOTH is supplied to the module DWELL and represents the position of the crankshaft to within one tooth of the toothed wheel. This module MISDET compares the period between each tooth and thereby detects the missing teeth. When a missing tooth is detected, this module reestablishes a relationship between the variable TOOTH and the absolute position of the crankshaft. The module MISDET also calculates the fire period and supplies this as a variable FIRE PERIOD to the module IGNLU and SAFIRE. In the present example, ignition occurs each time the crankshaft rotates through approximately 180°. The fire period is defined as the time which is taken for the crankshaft to rotate through exactly 180°.

The module IGNLU receives a variable MAN PRESS representing manifold pressure and this variable is derived from the output signal of transducer 10b.

In each of tables 14, 15, 44, 45 and 46, the values are stored for each combination of engine speed and manifold pressure. In order to address these tables, the module IGNLU generates address variables SPEED and LOAD corresponding respectively to engine speed and manifold pressure.

The module IGNLU also calculates engine speed from the variable FIRE PERIOD and supplies this as a variable ENG SPEED to each of the modules SAFIRE and DWELL.

The module IGNLU calls sub-module LOOK UP 2 which calculates the basic spark advance angle as a variable SPK ANG BASE by a standard interpolation process. This variable is then supplied to module SAFIRE. The module IGNLU also calls the submodule LOOK UP 1 which calculates the basic value for the air/fuel ratio by a similar standard interpolation process and supplies this as a variable AFR BASE to the module SAFIRE.

The module SAFIRE generates a perturbation value which varies alternately between +3° to −3° of spark advance angle at a frequency of 10 Hz. The module SAFIRE calls the sub-routine LOOK UP 2 CORRECTION to obtain a correction value for the spark advance. The perturbation value, this correction value and the basic spark advance value SPK ANG BASE are summed to produce a commanded spark advance value SPK ANG which is supplied to the module DWELL.

The module SAFIRE also calls the sub-routine LOOK UP 1 CORRECTION to obtain a correction value for the air/fuel ratio. This correction value is summed with a basic air/fuel ratio value AFR BASE to produce a commanded air/fuel ratio value AFR and this is supplied to module DWELL.

The module SAFIRE also calculates the slope of engine output with respect to spark advance. The maximum effect of perturbing the spark advance angle on engine speed is found to occur almost half a perturbation cycle after each change in the sign of the perturbation with a perturbation frequency of 10 Hz. Thus, in a perturbation cycle, the spark advance angle is increased by 3° from the base value. The fire period associated with the increased value is recorded just before the spark advance angle is reduced by 3° from the base value 50 ms later. The fire period associated with a reduced spark advance angle is recorded just before the spark advance angle is increased again by 3° from the base value 100 ms after the start of the cycle. If the engine is operating under conditions such that increasing the spark advance angle causes acceleration and reducing the spark advance angle causes deceleration, the second value for the fire period will be longer than the first value for the first period. The first value for the fire period is subtracted from the second value and the resulting difference represents the slope.

The module SAFIRE also causes the sub-modules MAPSTORE 1 and MAPSTORE 2 to update correction tables 45 and 44 using the control strategy contained in the sub-module CORRECTION DIVISION and error apportionment table 46. Each time one of these tables is updated, this is performed in accordance with the following formulas:

Spark advance:

new correction = old correction + $k_1$ (SLOPE ERROR)

air fuel ratio:

new correction = old correction + $k_2$ (SLOPE ERROR)

In these formulas, the values of $k_1$ and $k_2$ may either be fixed, or vary with speed and load as defined in error apportionment table 48. In the first control strategy, the sub-module CORRECTION DIVISION determines whether spark advance or air/fuel ratio should be corrected, and so enables either of sub-modules MAPSTORE 1 or MAPSTORE 2. In the second control strategy, both of these sub-modules will be enabled and values of $k_1$ and $k_2$ will be selected from the error apportionment table by sub-module CORRECTION DIVISION. In the example shown in FIG. 6, SLOPE ERROR in the above formulas is the actual slope value. This is where the spark advance angle and air/fuel ratio are corrected so as to obtain zero slope. If it is desired to have a non-zero value of the slope at certain engine speeds and load demands, a further table may be provided which contains these values. The slope demand (desired slope) values are then compared with the actual slope values to provide the variable SLOPE ERROR. As can be readily appreciated, correction tables 44 and 45 are updated at points corresponding to the prevailing engine speed and load demand.

The module DWELL uses the variables TOOTH and ENG SPEED to cause microcomputer 30 to provide appropriate signals to ignition driver 35 and injector driver 36 to achieve ignition and fuel injection at appropriate crankshaft positions with the air/fuel ratio and the spark advance angle set to the commanded values.

FIGS. 7 and 8 show the sequence of operations of the modules set out in FIG. 6. The program comprises a main program MAIN PROGRAM shown in FIG. 7 and an interrupt routine TOOTH INTERRUPT shown in FIG. 8.

The interrupt routine shown in FIG. 8 is performed each time an interrupt signal is produced following the detection of a tooth. In this routine, the module MIS-DET is called in a step S1.

In the main program as shown in FIG. 7, the variable TOOTH is compared with a constant START TOOTH in a step S2. The constant START TOOTH is chosen to correspond to the correct angular position of the crankshaft to allow modules IGNLU, SAFIRE, and DWELL to be executed before the occurrence of the next spark. When equality is found in step S2, these three modules are performed successively in steps S3, S4 and S5 before returning to step S2. Thus, the modules IGNLU, SAFIRE and DWELL are executed synchronously with the firing of the engine and these modules are always executed between actual sparks.

The combined control of spark advance angle and air/fuel ratio can also be applied to individual cylinders of a multi-cylinder engine.

In a multi-cylinder engine, the air/fuel ratio may vary from cylinder to cylinder due to distribution problems or differences in the characteristics of the fuel injectors of the individual cylinders. With present manufacturing techniques, Applicants have found that the air/fuel ratio varies by up to 0.6 of a unit between individual cylinders.

Also, in a multi-cylinder engine, particular cylinders may have faster burning characteristics than others due, for example, to thermal effects from neighboring cylinders or compression ratio or valve timing differences. At the same air/fuel ratio, optimum spark advance angles may vary by up to 6° between cylinders. If the spark advance angle is set to a target value and the air/fuel ratio is controlled so as to achieve a target slope value, the differences between the fast and slow burn cylinders can lead to a difference of two units in the air/fuel ratio. Although controlling the air/fuel ratio in this manner may help to reduce emission of nitrogen oxides, it will lead to an imbalance in torque between the individual cylinders.

Therefore, applicants consider that the best strategy for controlling spark advance and air/fuel ratio for individual cylinders is to correct the spark advance angle within a set window and, when the correction to the spark advance angle reaches one of the limits of this window, to control the air/fuel ratio to achieve a target slope value. A window which extends by 3° of spark advance angle on each side of a mid-point would be appropriate.

As noted above, the variation in air/fuel ratio between individual cylinders is small compared with the effect of the variation in optimum spark advance angle. With further improvements in fueling systems in which each cylinder has an individual electrically controlled injector, the differences may become even smaller. It may therefore become appropriate to adopt a control strategy in which the spark advance angle is controlled separately for the individual cylinders but the air/fuel ratio is controlled simultaneously for all cylinders. With such a strategy, the air/fuel ratio control would commence when either the correction to the spark advance angle for one cylinder reaches the limit of the window or when the average of the corrections to the spark advance angle over all the cylinders reaches the specific value.

In an engine where groups of cylinders have a common fuel control device, such as a common carburetor or a common fuel injection control device, the control strategy could be implemented by correcting the spark advance angle for each individual cylinder and controlling the air/fuel ratio for each group of cylinders.

An embodiment of the present invention in which control of spark advance angle and air/fuel ratio is applied to individual cylinders will now be described with reference to FIG. 9.

Figure 9:
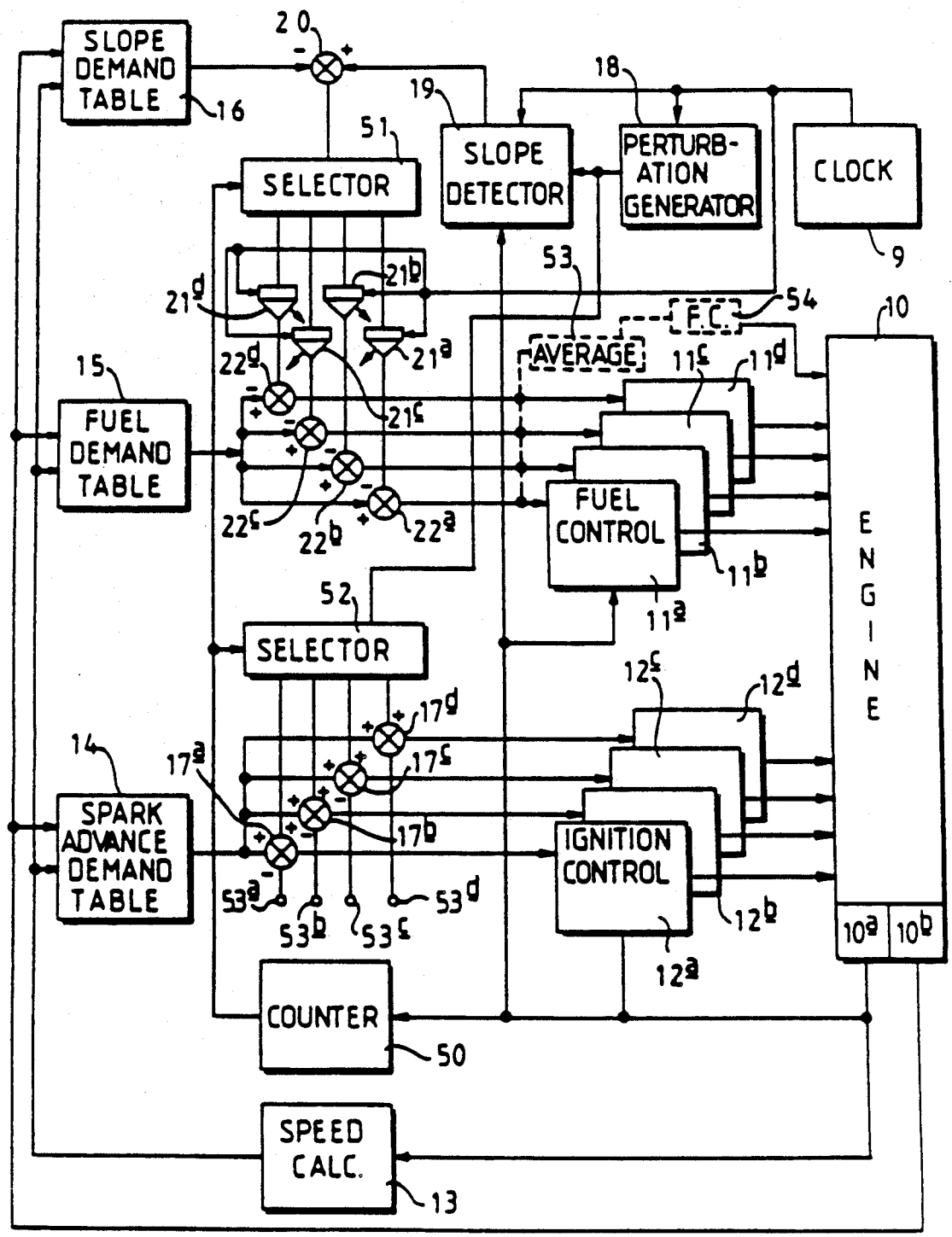
FIGS. 9 to 15 are diagrams of the functional components of six further adaptive control systems embodying this invention.

FIG. 9 shows a system which is similar in principle to that shown in FIG. 1 but in which the spark advance angle is optimized for each individual cylinder of a four cylinder engine and in which the air/fuel ratio is corrected for each individual cylinder in accordance with a particular control strategy.

The control strategy may take the form of the first method discussed above in which the spark advance angle is optimized within a window which extends, say, by 3° from each side of a mid-point, and then the air/fuel ratio is corrected. Alternatively, the control strategy may take the form of the second method discussed above in which the spark advance angle and the air/fuel ratio are corrected together.

In FIG. 9, engine 10, and transducers 10a and 10b are as described for FIG. 1. Ignition control device 12 of FIG. 1 is replaced by four individual control devices 12a, 12b, 12c and 12d each of which controls the respective individual cylinder. Fuel control device 11 of FIG. 1 is replaced by four separate fuel control devices 11a, 11b, 11c and 11d, each of which controls the air/fuel ratio for an individual cylinder. Look up tables 14, 15 and 16 in FIG. 9 are exactly the same as described for FIG. 1.

The system of FIG. 9 includes a counter 50 which determines which of the four cylinders is to be optimized. Each cylinder is optimized for a fixed duration which corresponds to a preset number of engine fires. Counter 50 selects a different cylinder after this duration expires.

The output of counter 50 is supplied to a pair of selectors 51 and 52. Selector 52 determines which of four summers 17a, 17b, 17c and 17d receives the perturbation signal at any given time. Only the selected cylinder is perturbed.

Selector 51 determines which of four integral controllers 21a to 21d is updated. Each of these four controllers takes the same general form as controller 21 and thus comprises two linked sections which together provide two outputs. One of these outputs represents a correction to the air/fuel ratio and the other output represents the correction to the spark advance angle. As shown in FIG. 9, one set of these outputs is connected to negative inputs of a set of four summers 22a to 22d connected between fuel demand table 15 and fuel control devices 11a to 11d. The other set of outputs are connected via a set of terminals 53a to 53d to negative inputs of summers 17a to 17d. For reasons of clarity, the connections between this further set of outputs and terminals 53a and 53d are not shown in FIG. 9. In each of controllers 21a to 21d, the corrections between the two outputs are apportioned using one of the control strategies mentioned above. As in the example of FIG. 1, the controllers 21a to 21d need not be linked and each could use a transfer function other than an integral one.

After selecting a cylinder, the operation of the system of FIG. 9 is similar to that of FIG. 1. In summers 17a to 17d, the corrections to the spark advance angle derived from the outputs of controllers 21a to 21d are subtracted from the spark advance angle derived from table 14. The perturbation signal from perturbation generator 18 is directed via selected 52 to the summer corresponding to the selected cylinder. The resulting output signals from summers 17a to 17d are applied to ignition control devices 12a to 12d.

The perturbation signal together with a signal from transducer 10a and clock 9 is supplied to the slope detector 19. This operates to monitor the effect of the perturbation in spark advance angle on engine speed. Detector 19 produces an output signal proportional to the slope of engine speed with respect to spark advance angle for the selected cylinder. This signal is supplied to error detector 20 which compares the actual value of the slope with the desired value of the slope derived from table 16. The resulting error signal is then directed via selector 51 to the particular controller 21a to 21d which corresponds to the selected cylinder.

In a modification, indicted in FIG. 9 by dashed lines, the outputs of summers 22a to 22d are connected to an averaging circuit 53, and the output of averaging circuit 53 is applied to a common fuel control device 54 for all the cylinders. By way of a further modification, averaging circuit 53 may be replaced by a circuit in which either the richest or the leanest fuel demand signal from summers 22a to 22d is selected for application to fuel control device 54.

The magnitude of the signal produced by slope detector 19 for an individual cylinder will be smaller than the magnitude of the corresponding signal for the system described with reference to FIG. 1. However, the noise component in this signal is comparable with the noise component for the system described with reference to FIG. 1. Controllers 21a to 21d of FIG. 9 have nominally the same gain as controller 21 of FIG. 1. This results in a longer time for correcting the air/fuel ratio of the spark advance angle than that required by the system of FIG. 1.

In general, for a small change in spark advance angle, the slope of engine speed with respect to spark advance angle of an individual cylinder will differ from that for the entire engine. In the average sense, the slope of an individual cylinder will approximately one quarter of the slope of the entire engine. Consequently, the contents of table 16 of the system shown in FIG. 9 should be about one quarter of the magnitude of the contents of table 16 of the system of FIG. 1.

Several embodiments of the present invention will now be described in which the slope error is recorded and then used by a diagnostic unit during service of the vehicle to detect faults in the fuel controller.

Figure 10:
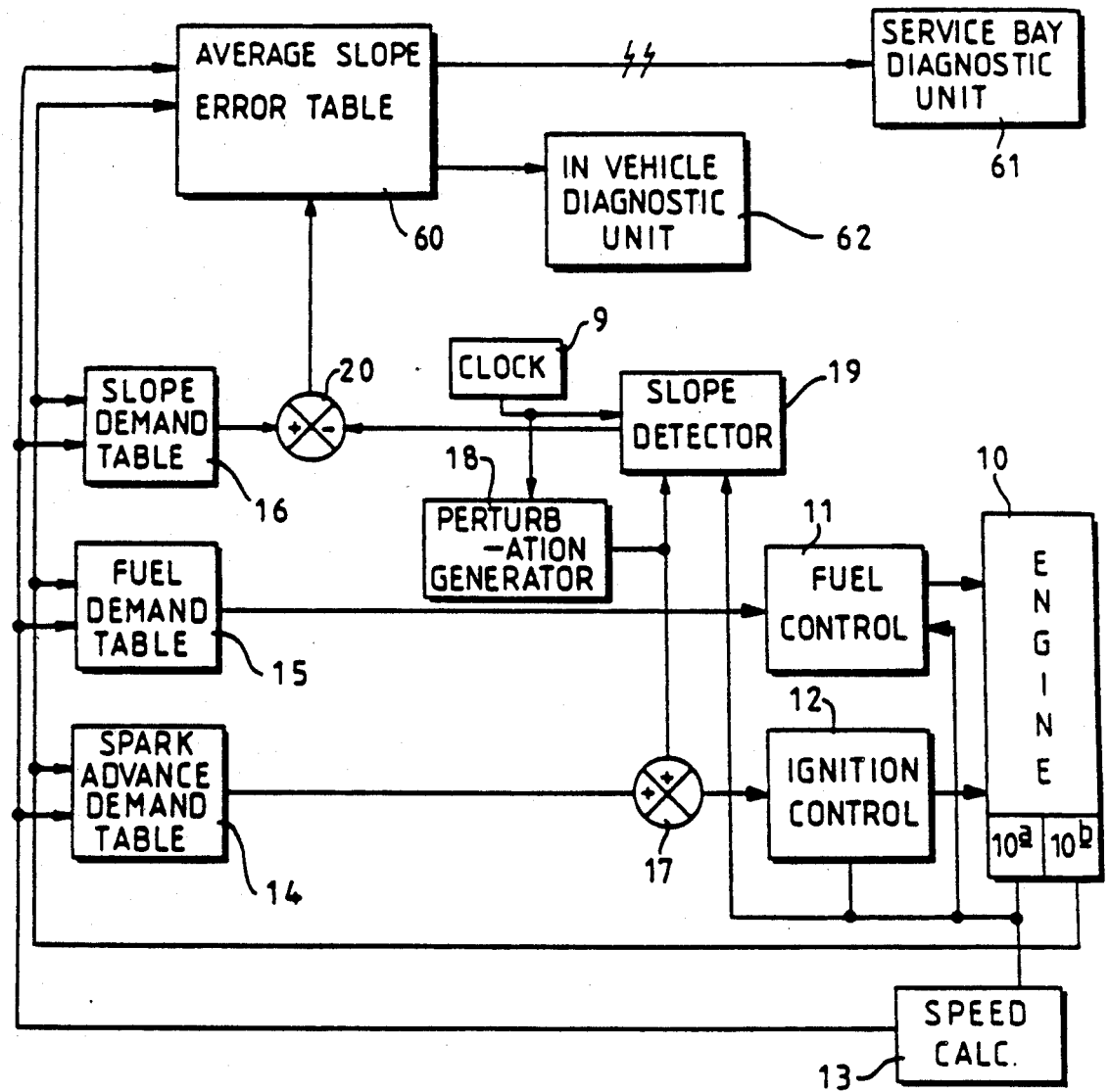

Referring now to FIG. 10, the parts of the system which are identical to those FIG. 1 are denoted by the same reference numerals. However, the system does not include controller 21, or summers 22 and 24. Thus, fuel control device 11 and ignition control device 12 use the outputs of tables 15 and 14 directly without correction.

The system shown in FIG. 10 includes a table 60 which stores the slope errors. The table 60 receives the output of manifold pressure transducer 10b and speed calculator 13 as address inputs and the slope errors are stored as a running time average as a function of engine speed and load demand.

As discussed fully above, in production engines the slope achieved in fast and slow burn engines will differ from a normal burn engine which may have been used in pre-production rig testing to derive the values to be stored in tables 14 to 16. Thus, some stored slope errors are to be expected for this reason. However, any errors which exceed those expected for slow burn and fast burn engines must result from a fault in the control device 11. When the vehicle is being serviced, table 60 is connected to a service bay diagnostic unit 61 which checks for the presence of any such excessive errors. If such errors are found, then the fault in fuel control device 11 may be rectified. Table 60 may be connected to an in-vehicle diagnostic unit 62 which provides a warning signal to the driver in the event of detecting severe slope errors.

As discussed with the reference to FIG. 1, the control device 11 is an electronic fuel control device. Such control devices suffer from errors in performance resulting from production differences and aging of components. In particular, solenoid type fuel injectors are prone to changes in fuel delivery characteristics due to gum or other deposits forming in the discharge orifices. With the system shown in FIG. 10, these errors can be detected and rectified.

Vehicle diagnostic unit 62 can also be arranged to record changes in average slope error with vehicle age so as to detect drift of fuel control device 11. As a further enhancement of this system, an output may be provided from vehicle diagnostic unit 62 to a summer on the output of fuel demand table 15 to correct the drift in fuel control device 11 and remove the average slope errors.

The system of FIG. 10 can also be used with other types of fuel control devices. For example, the system could be used with a conventional carburetor of purely mechanical construction.

Figure 11:
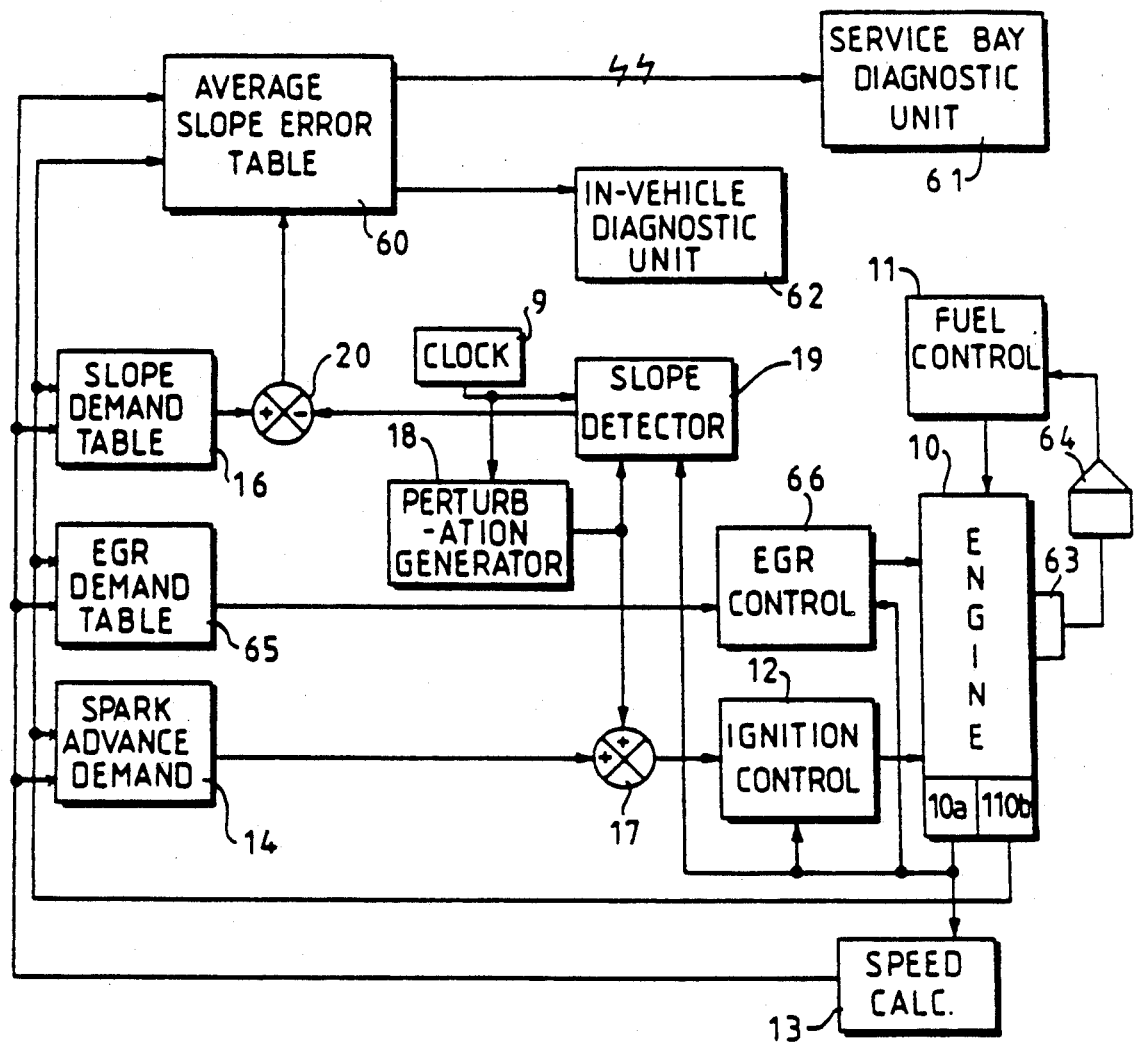

Referring now to FIG. 11, there is shown another embodiment in which the slope errors are recorded. In this embodiment, part of the exhaust gas is recirculated to the cylinders. Engine 10 is provided with a sensor 63 for detecting the presence of oxygen in the exhaust gas. The output of sensor 63 is provided to the input of a controller 64, which may have an integral transfer function, and the output of controller 64 is supplied as an input signal to fuel control device 11. Sensor 63 and controller 64 are arranged so that fuel and air will be supplied to the engine in stoichiometric proportions. Transducer 10b of FIG. 1 is replaced by an engine load sensor 110b which detects the throttle angle position.

The system of FIG. 11 also includes a look up table 65 which contains values of the recirculation ratio for the exhaust gas as a function of engine speed and load demand. Look up table 65 receives inputs from engine load sensor 110b and speed calculator 13 and provides a control signal to a control device 66 which controls recirculation of the exhaust gas.

As before, the slope errors are stored in look up table 60 and table 60 can be interrogated by diagnostic units 61 and 62. In this case, the interrogation is performed to detect faults in exhaust gas recirculation control device 66. Such control devices are prone to blocking from deposits and corrosion from the exhaust gas environment.

By way of simplification, in the system of FIG. 11, sensor 63, controller 64 and fuel control device 11 may be replaced by a conventional mechanical carburetor.

The system shown in FIG. 11 can be modified to control the exhaust gas recirculation level directly. With this modification, the slope error data is passed directly to a controller, which is similar to controller 21 of FIG. 1. This controller then supplies outputs to summers on the outputs of exhaust gas recirculation demand table 65 and spark advance demand table 14. This controller corrects both the exhaust gas recirculation and spark advance in accordance with either the first or the second control strategy described above. With the first control strategy, the spark advance will be corrected within a preset window and then the exhaust gas recirculation will be corrected. With the second control strategy, the spark advance and exhaust gas recirculation are corrected together. Air/fuel ratio is still controlled either to stoichiometric proportion by oxygen sensor 64 and fuel control device 11 as shown in FIG. 11 or via a conventional mechanical carburetor, or open loop fuel injection system.

Figure 12:
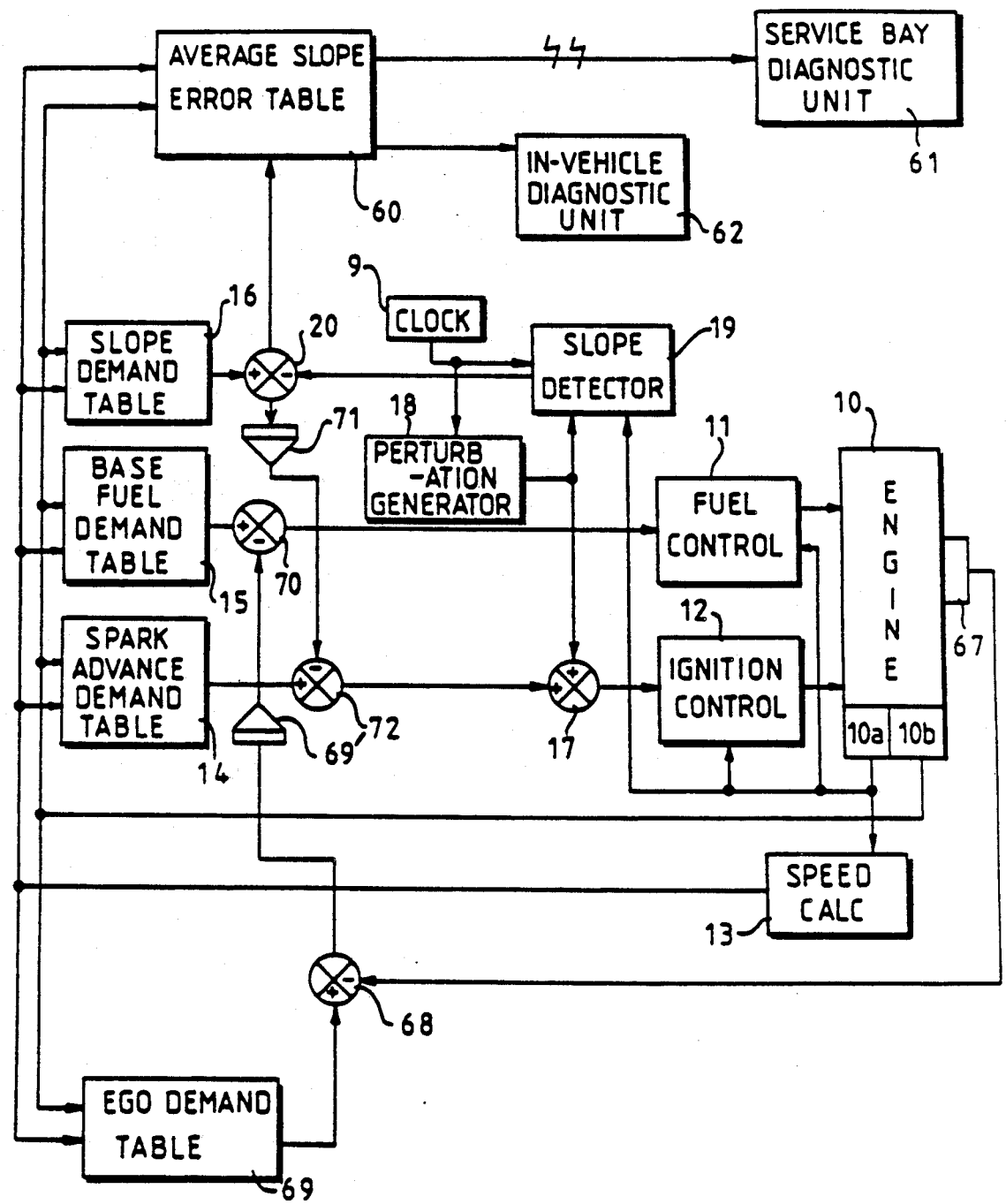

FIG. 12 shows another embodiment in which the slope errors are stored. In this embodiment, the lean burn approach is used and a feed-back signal is provided from a sensor which detects the oxygen level in the exhaust gas.

Referring now to FIG. 12, parts which are the same as those shown in FIG. 10 are denoted by the same reference numerals and will not be further described. In FIG. 12, the engine is provided with a sensor 67 for detecting the level of oxygen in the exhaust gas. Sensor 67 can detect the oxygen level over a wide range. The output of sensor 67 is connected to the negative input of a summer 68.

The system of FIG. 12 also includes a look up table 69 which contains demand values for the level of oxygen in the exhaust gas. Table 69 receives address inputs from the manifold pressure transducer 10b and speed calculator 13 and provides an output to a further input of summer 68. The output of summer 68 is connected to the input of a controller 69, which may have an integral transfer function. The output of controller 69 is connected to the negative input of a summer 70 which is connected between fuel demand look up table 15 and fuel control device 11.

In FIG. 12, the output of error detector 20 is also connected to the input of a controller 71, which may also have an integral transfer function. The output of controller 71 is connected to the negative input of a summer 72 positioned between the output of look up table 14 and summer 17. Controller 71 is arranged to correct the output from look up table 14 by up to 3° of spark advance angle.

Presently known exhaust gas oxygen sensors can be used to control air/fuel ratio over a wide range, for example 10:1 to 30:1, with an accuracy of 0.5 of a unit. However, such sensors have not yet proven reliable in extended vehicle test work. With the system shown in FIG. 12, slope error look up table 60 could be interrogated by service bay diagnostic unit 61 to detect faults in sensor 67. Also, in-vehicle diagnostic unit 62 could be arranged to output a warning signal in the event of detecting severe slope errors and could also supply a signal to fuel control device 11 so that this device operates in a fail-safe mode.

Figure 13:
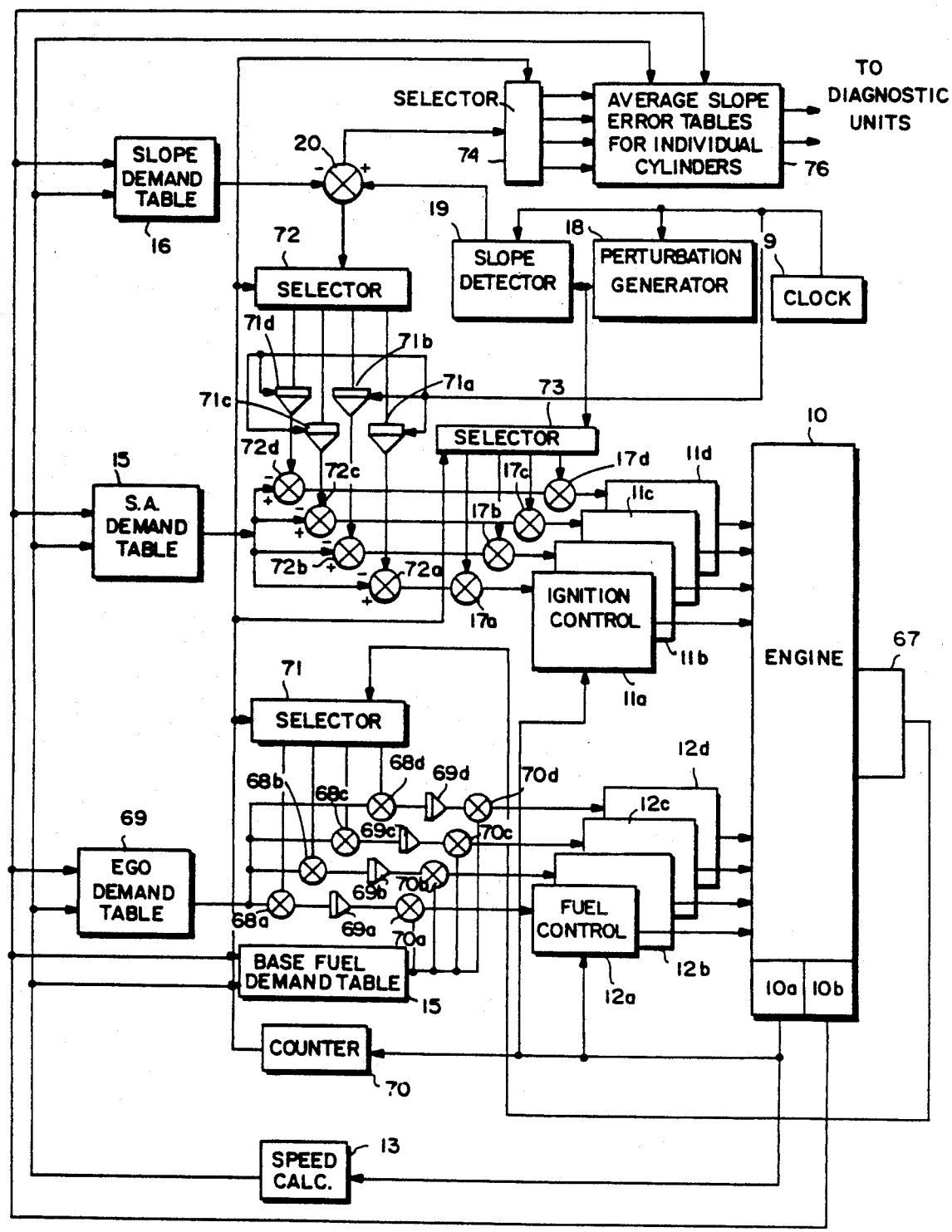

The system shown in FIG. 12 can be modified so as to correct the spark advance angle and the air/fuel ratio for each individual cylinder and so as to record the slope errors for each individual cylinder. Such a system is shown in FIG. 13. In FIG. 13, parts which are the same as those of FIG. 12 are denoted by the same reference numerals and will not be described further.

Referring now to FIG. 13, fuel control device 11 of FIG. 12 is replaced by four individual fuel control devices 12a to 12d, each of which controls the fuel supplied to an individual cylinder. Fuel control devices 12a to 12d may comprise multipoint electronic fuel injectors. Ignition control device 12 of FIG. 12 is replaced by four individual ignition control devices 11a to 11d for the individual cylinders.

The system of FIG. 13 includes a counter 70 responsive to position transducer 10a. Counter 70 is responsible for selecting each cylinder in turn and does so by counting the engine fires. Counter 70 provides control signals to four selectors 71 to 74. In the system of FIG. 13, the output of error detector 20 is connected through selector 72 to each of four controllers 71a to 71d which replace controller 71. The outputs of these four controllers are supplied to the negative inputs of four summers 72a to 72d which replace summer 72. The outputs of these four summers are supplied to the inputs of four summers 17a to 17d which replace summer 17 and whose output signals are supplied to the individual ignition control devices 11a to 11d.

The signal from perturbation generator 18 is supplied through selector 73 to further inputs of each of summers 17a to 17d.

The exhaust gas oxygen sensor 67 is located at the common junction of the exhaust pipes from the individual cylinders so that it can detect difference in the air/fuel ratio between the individual cylinders. The output of sensor 67 is connected through selector 71 to inputs of four summers 68a to 68d which replace summer 68. The other inputs of these summers receive the output from exhaust gas oxygen demand map 69.

The outputs of summers 68a to 68d are connected to the inputs of four controllers 69a to 69d which replace controller 69. The outputs of these four controllers are connected to the inputs of four summers 70a to 70d which replace summer 70. The other inputs of these four summers 70a to 70d receive the output from fuel demand table 15 and the outputs of these four summers are connected to the inputs of the four individual fuel control devices 12a to 12d.

Thus, in FIG. 13, the output from error detector 20 is used to correct the spark advance angle for each individual cylinder. Similarly, the output signal from sensor 67 is used to correct the fuel demand cylinder for each individual cylinder.

The output of error detector 20 is also connected through selector 74 to four individual look up tables 76 which record the average slope errors for the individual cylinders. The output of look up table 76 may be supplied to a service bay diagnostic unit and also to an in-vehicle diagnostic unit. These diagnostic units can be used to detect faults in sensor 67 as well as various other faults on an individual cylinder basis.

Figure 14:
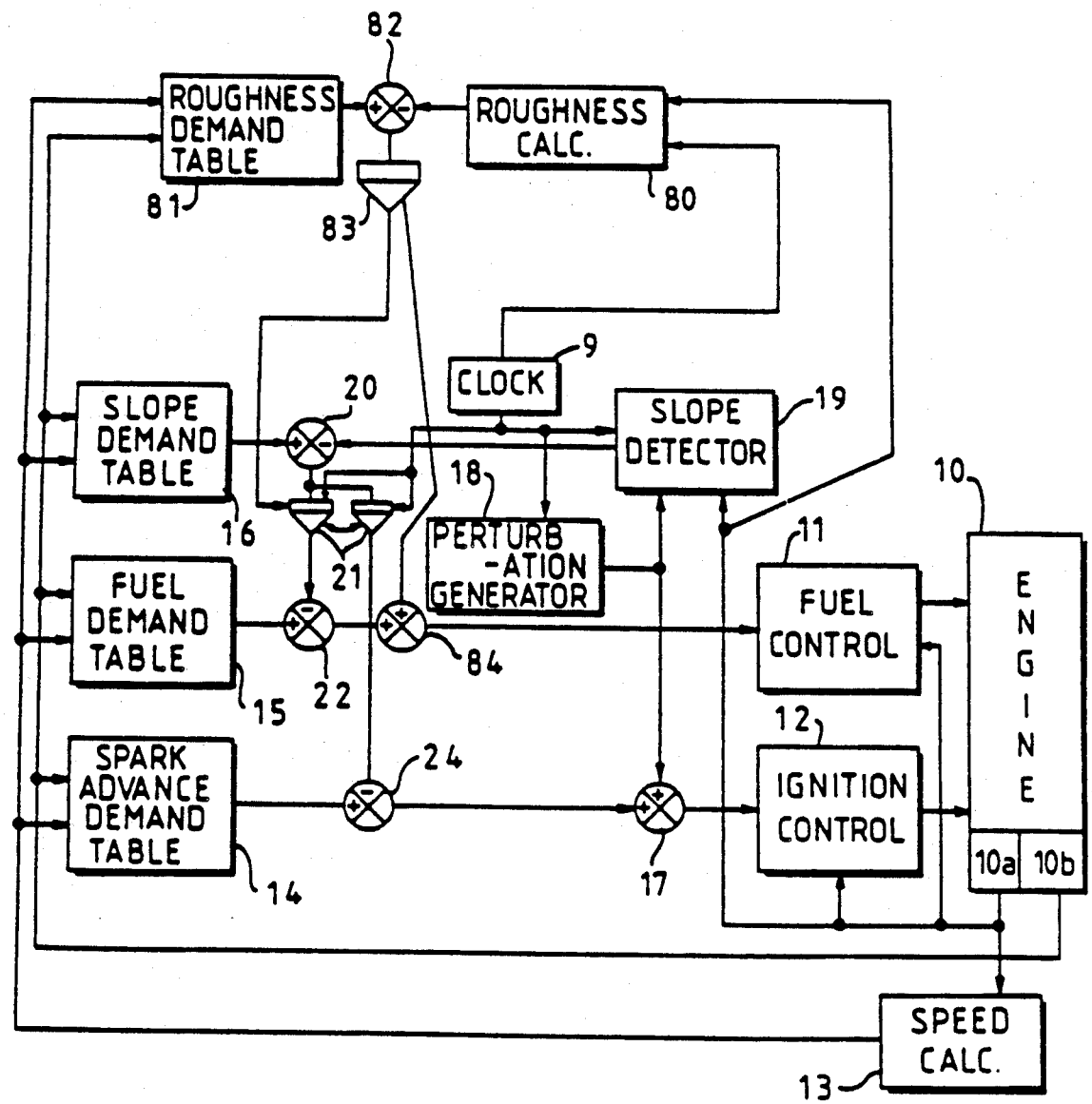

An embodiment will now be described in which engine roughness is detected and used to provide an override signal for correcting the fuel demand signal to prevent engine roughness reaching an excessive level. This system is shown in FIG. 14. Parts which are similar to the system shown in FIG. 1 are denoted by the same reference numerals and will not be described further.

Referring now to FIG. 14, the output of position transducer 10a is supplied to a roughness calculator 80. The system also includes a look up table 81 which contains demand values for the engine roughness as a function of engine speed and load demand. Look up table 81 receives inputs from the manifold pressure transducer 10b and speed calculator 13 and supplies an output signal to one input of a summer 82. The other input of summer 82 receives the output of roughness calculator 80 and the output of summer 82 is supplied to the input of a controller 83. Controller 83 supplies one output signal to that section of controller 21 which supplies an output to summer 22 and provides a further signal to an input of a summer 84. Summer 84 has its other input connected to the output of summer 22 and provides its output as a control signal to fuel control device 11.

Controllers 21 and 83 are arranged so that, in the event of engine roughness approaching an excessive level, the correction to the fuel demand signal caused by controller 83 overrides correction of slope errors.

As stated previously, position transducer 10a detects each 180° of crankshaft angle and the roughness calculator 80 uses to detect roughness. The technique used may be that proposed in U.S. Pat. No. 4,178,891, incorporated herein by reference or in SAE paper No. 840443, also incorporated herein by reference. Roughness calculator 80 may be implemented as a further module of the computer program shown in FIG. 6.

A roughness calculator may be incorporated into any of the other embodiments previously described including those which include exhaust gas recirculation.

In the embodiments of FIGS. 9 and 13, the slope error is used for control of individual cylinders to achieve slope targets. As will now be described, further use may be made of the slope error data for individual cylinders at idle speeds.

During engine idle, it is important to avoid excessive roughness or idle instability. Low idle speeds produce low amounts of emissions of pollutants and improve fuel consumption but such speeds often increase roughness. Often one cylinder performs worse than others and causes a significant increase in the overall roughness.

Poor combustion at idle speeds is associated with high levels of diluton of the fuel mixture with residual exhaust. This is due to poor scavenging at low inlet manifold pressures and also to reverse flow of exhaust gases during the valve overlap period. Relatively rich fueling is required to maintain stable combustion and large increases in engine roughness can occur for small fueling errors in the lean direction.

Cylinder to cylinder variation in the dilution of the fuel mixture by residual exhaust gas can also be caused by variations in compression ratio and valve timing.

This means that for a given level of combustion quality, the air/fuel ratio should be varied between the cylinders so as to compensate the dilution level of the fuel mixture by residual exhaust gases.

As mentioned with reference to FIG. 14, a roughness calculator can be added to the system of FIG. 9 or 13 by adding a further software module. Using such a roughness calculator, and using the slope error data for the individual cylinders for low load conditions, Applicants have found that idle conditions should be controlled as follows:

(1) The spark advance angle is set to a value known to give the best compromise between fuel economy and emission of hydrocarbons;

(2) The mean fueling level is kept fixed but the fuel apportioned between the individual cylinders according to the individual slope errors, the most fuel being delivered to the cylinder with the most positive value for the slope errors; and (3) The idle speed is then decreased until the roughness limit is reached.

The amount by which the fuel is apportioned according to the slope error is fixed empirically. This system gives the lowest possible idle speed for a given level of roughness for a particular engine.

The slope errors for the individual cylinders can also be used to avoid engine knock in the following way. Compression ratio differences which may cause knock on one cylinder can most effectively be measured through the differences in the slope errors between the individual cylinders at low load low speed conditions. The occurrence of knock at higher loads and speeds is not necessarily avoided by using the differences between the slope errors which occur at such operating conditions. Therefore, in order to avoid knock at certain engine speeds and high load demand combinations which are known to be most prone to engine knock, the slope differences measured at low load are used. Specifically, the average spark advance for the cylinders is maintained at the value which is appropriate for the particular engine speed/load demand but the slope differences obtained at low load low engine speed are used to vary the spark advanced angle between the individual cylinders. The most advanced spark angle is given to the cylinder with the most positive slope errors. The amount by which the spark advance is apportioned according to the slope errors is fixed empirically.

The invention has been described for use with a conventional fuel mixture control device which alters the rate of fuel flow while the rate of air flow or the rate of mixture flow is controlled by the driver of the vehicle in which the engine is installed. However, the invention is also applicable to unconventional systems in which the fuel mixture control device alters the rate of air flow and the fuel flow is directly controlled by the driver. In this case, graphs equivalent to those shown in FIG. 2 may be derived but with speed and fuel flow rate held constant rather than speed and air flow rate.

With such an unconventional system, in the example of FIG. 1 or FIG. 9, spark advance demand values are chosen for storage in spark advance look up table 14, and an air demand look up table would replace fuel demand look up table 15. Fuel controller 11 is replaced by an air flow control device such as a servo-driven throttle butterfly.

In the embodiments of the invention described in FIGS. 1, 9 and 14 the engine input which is perturbed to measure the slope of engine output with respect to said input is also one of the two inputs which are corrected in accordance with the control strategy to obtain the desired value of said slope. A further embodiment of the invention is a system where the perturbed input is not one of the two controlled inputs.

Figure 15:
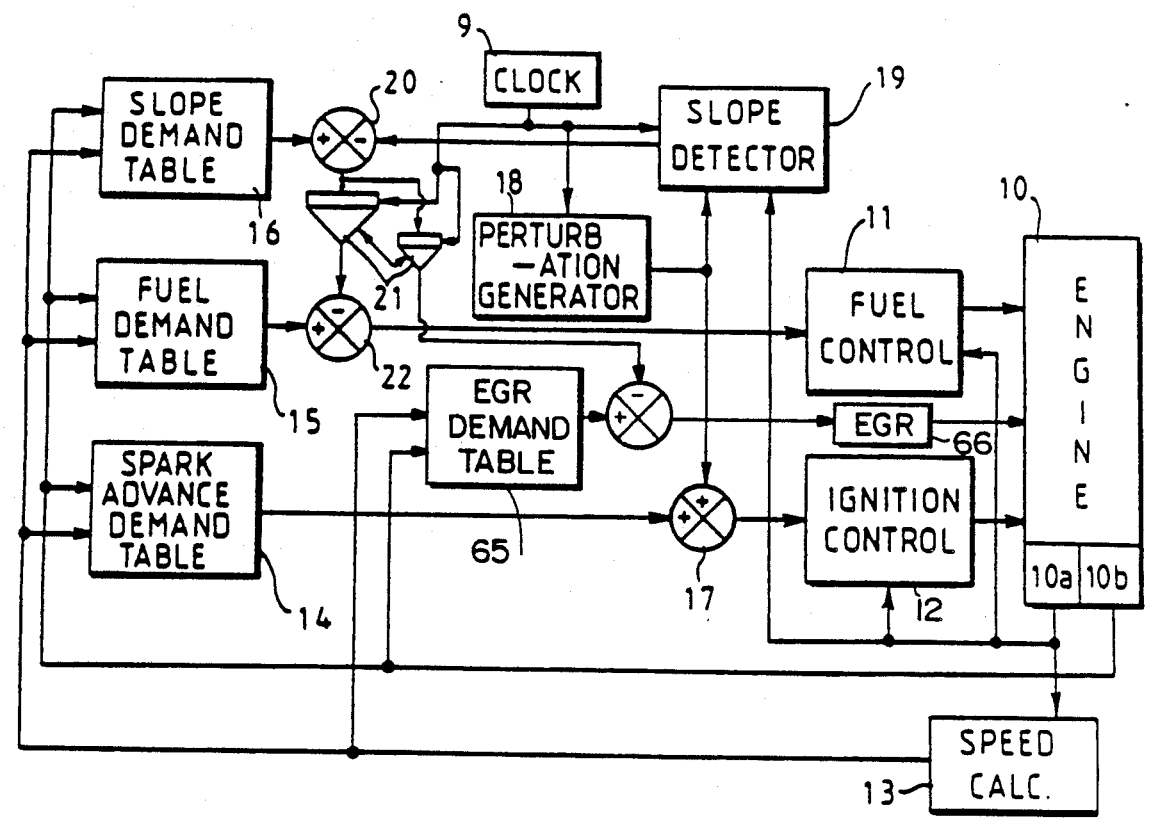

Such a system can be described with reference to a modification of FIG. 1 as shown in FIG. 15. In this modification an exhaust gas recirculation demand table and exhaust gas recirculation control device (shown respectively as 65 and 66 in FIG. 11) are added and summer 24 with the second output from controller 21 is moved from the output of the spark advance demand table to the output of the exhaust gas recirculation demand table. The slope error from summer 20 is now apportioned within controller 21 according to either of the strategies previously described allowing for any compensation required with the first control input being exhaust gas recirculation instead of spark advance angle.

No corrections are applied to the spark advance angle. Ignition control device 12 uses the output from summer 17 which is now the base spark advance angle added to the perturbation.

The various embodiments discussed above relate to a spark ignition engine. However, the present invention could equally be applied to a compression ignition engine. In a compression ignition engine, instead of controlling the spark advance value, the ignition timing is controlled by controlling the timing of the fuel injection.

In all the embodiments discussed above, the slope of engine speed with respect to spark advance has been determined by perturbing the spark advance angle. Alternatively, the slope of engine speed with respect to a parameter relating to the fuel mixture, such as the air/fuel ratio, may be determined by perturbing such parameter. Two control inputs of the engine, such as the spark advance angle and the air/fuel ratio, may then be controlled using one or the other control strategies discussed above.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

We claim:

1. An adaptive control system for an engine having at least two control inputs which affect an engine output, said system comprising:
   means for establishing a base value for a particular said control input in accordance with engine operating conditions;
   perturbation means for periodically perturbing said particular control input about said base value;
   slope determination means, responsive to perturbations of said particular control input, for determining an actual slope of engine output with respect to said particular control input; and
   control means for controlling a first said control input and a second said control input so as to cause said actual slope to correspond to a desired slope value.

2. The system as in claim 1, further comprising means for determining said desired slope value as a function of engine operating conditions.

3. The system as in claim 2, further comprising comparison means for determining any difference between said actual slope and said desired slope value and storage means, responsive to said comparison means, for storing information relating to said difference.

4. The system as in claim 1, wherein said control means first modifies said first control input within a given range to cause said actual slope to move closer to said desired slope value and then modifies said second control input until said actual slope equals said desired slope value.

5. The system as in claim 4, wherein said given range is a predetermined percentage above and below a starting base value of said first control input.

6. The system as in claim 1, wherein said control means includes means for simultaneously modifying said first control input and said second control input in accordance with a predetermined apportionment formula.

7. The system as in claim 6, wherein said predetermined formula is such that said first control input is modified by a predetermined proportion of the modification made to said second control input.

8. The system as in claim 1, wherein said particular control input is the same input as one of said first control input and said second control input.

9. The system as in claim 1, wherein said particular control input is different from both said first control input and said second control input.

10. An adaptive control system for an engine having at least two control inputs which affect an engine output, said system comprising:
    first means for establishing a first base value for a first said control input as a function of engine operating conditions;
    second means for establishing a second base value for a second said control input as a function of engine operating conditions;
    perturbation means for periodically perturbing a particular control input;
    slope detection means, responsive to perturbations in said particular control input, for determining an actual slope or differential of said engine output with respect to said particular control input as it is perturbed by said perturbation means; and
    correction means for applying corrections to said first base value and said second base value, to obtain corrected values for said first control input and corrected values for said second control input, said correction means including means for causing said actual slope to correspond to a desired slope value.

11. The system as in claim 10, further comprising means, responsive to said correction means and said slope detection means, for modifying said first means and said second means after corrections supplied by said correction means have become stabilized to supply a modified first base value and a modified second base value, respectively, corresponding to prevailing engine operating conditions such that said correction means causes said actual slope to correspond more quickly to said desired slope.

12. The system as in claim 10, wherein said engine is an internal combustion engine, said system further comprises an ignition timing control means responsive to said first control input and a fuel mixture control means responsive to said second control input, and said particular control input is said first control input.

13. The system as in claim 12, wherein said fuel mixture control means controls one of air fuel ratio and exhaust gas recirculation.

14. The system as in claim 12, further comprising means for detecting engine roughness and means for overriding one of said first corrected value and said second corrected value in response to engine roughness exceeding a predetermined level.

15. The system as in claim 10, wherein said correction means first applies corrections up to a predetermined maximum magnitude to one of said first base value and said second base value, and thereafter applies corrections to the other of said first base value and said second base value.

16. The system as in claim 10, wherein said correction means applies corrections simultaneously to both said first base value and said second base value, said corrections being related to each other by a predetermined formula.

17. The system as in claim 10, wherein said engine is a multi-cylinder internal combustion engine, and said system further comprises (i) means for establishing a plurality of cylinder combinations, each combination including at least one cylinder and (ii) means for selecting each combination in turn, and said correction means applies corrections individually to at least one of said first base value and said second base value for each cylinder combination, said perturbation means perturbs said particular control input for each cylinder combination when it is selected, said slope detection means determines the slope for each cylinder combination when it is selected, and said control strategy is such that a desired value of said slope is obtained for each cylinder combination.

18. An adaptive control system for an internal combustion engine having at least two control inputs which affect an engine output, said system comprising:
  a position transducer for generating crankshaft position signals;
  a load demand transducer for generating an output representing load demand on said engine;
  a speed calculation device, responsive to said position transducer, for providing an output representing engine speed;
  a first memory means for storing data representing a first said control input as a function of engine speed and load demand, and, responsive to said output from said speed calculation device and said load demand transducer, for providing an uncorrected output for said first control input at prevailing engine speed and load demand conditions;
  a second memory means for storing data representing a second said control input as a function of engine speed and load demand, and, responsive to said output from said speed calculation device and said load demand transducer, for providing an uncorrected output for said second control input at prevailing engine speed and load demand conditions;
  a perturbation means for applying a perturbation signal to a particular said control input;
  a slope detection means, responsive to said position transducer, for determining an actual slope of said engine output relative to said particular control input;
  a third memory means for storing data representing a desired slope or differential of said engine output relative to said particular control input as a function of engine speed and load demand, and, responsive to said output from said speed calculation device and said load demand transducer, for providing a desired slope for said engine output relative to said particular control input;
  error detection means, responsive to said output of said third memory means and said slope detection means, for comparing said desired slope and said actual slope and providing a slope error output having a magnitude and sign representing a compared relationship between said desired slope and said actual slope;
  controller means, responsive to said error detection means, for providing a first output and a second output as a function of said slope error output; and
  a correction means for summing said first output and said uncorrected output from said first memory means to obtain a corrected output for said first control input and for summing said second output and said uncorrected output from said second memory means to obtain a corrected output for said second control input, so that said magnitude of said slope error output is zero.

19. The system as in claim 18, wherein said desired slope is zero.

20. The system as in claim 18, wherein said desired slope has a non-zero magnitude.

21. The system as in claim 18, further comprising an ignition timing control means responsive to said first control input and a fuel mixture control means responsive to said second control input, and said particular control input is said first control input.

22. The system as in claim 18, wherein said controller means apportions said slope error output such that one of said first output and said second output has a value less than or equal to a predetermined maximum magnitude, and said correction means comprises means for summing said one of said first output and said second output with a corresponding one of said uncorrected output from said first memory means and said second memory means and for providing a corrected value for a corresponding one of said first control input and said second control input and thereafter for summing the other of said first output and said second output with said corresponding one of said uncorrected output from said first memory means and said second memory means, and for providing a corrected value for said corresponding one of said first control input and said second control input.

23. The system as in claim 18, wherein said controller means includes means for apportioning said slope error output such that said first output and said second output are related to each other by a predetermined formula and said correction means simultaneously sums said first output and said uncorrected output from said first memory means to obtain a corrected output for said first control input and sums said second output and said uncorrected output from said second memory means to obtain a corrected output for said second control input.

24. The system as in claim 18, wherein:
  (a) said engine is a multi-cylinder engine;
  (b) said control system further comprises (i) means for establishing a plurality of cylinder combinations, each combination including at least one cylinder, and (ii) means for selecting each combination in turn;
  (c) said correction means including means for summing individually with respect to each cylinder combination (i) said first output and said uncorrected output from said first memory means to obtain a corrected output for said control input and (ii) said second output and said uncorrected output from said second memory means to obtain a corrected output for said second control input;

(d) said perturbation means includes means for applying said perturbation signal to said particular control input for each cylinder combination when it is selected, and;

(e) said slope detection means includes means for determining said actual slope of said engine output relative to said particular control input for each cylinder combination when selected.

25. The system as in claim 24, wherein said second control input is a fuel control input, and said control system further comprises an averaging circuit and a common fuel mixture control means for each cylinder, and said correction means includes means for providing a sum of said second output and said uncorrected output from said second summary means for each cylinder combination when selected, to said averaging circuit, said averaging circuit including means for providing an average output to said common fuel mixture control device.

26. The system as in claim 24, wherein said second control input is a fuel control input, and further comprising a common fuel mixture control means for each cylinder and a selection means for selecting a particular corrected output from said second control input providing by said correction means for each cylinder combination when selected by said cylinder selection means which constitutes one of a leanest and a richest fuel demand output, and providing said particular corrected output to said common fuel mixture control means.

27. A method of controlling a power producing engine having at least two control inputs which affect an engine output, said method comprising:

(a) establishing a base value for a particular said control input in accordance with engine operating conditions;

(b) periodically perturbing said particular control input about said base value;

(c) determining an actual slope of engine output with respect to said particular control input; and (d) controlling a first said control input and a second said control input so as to obtain a desired value of said slope.

28. The method as in claim 27, wherein said desired value of said slope is determined as a function of engine operating conditions.

29. The method as in claim 28, further comprising determining any difference between said actual slope and said desired slope and storing information relating to said difference.

30. The method as in claim 27, wherein step (d) includes first modifying said first control input within a given range to cause said actual slope to move closer to said desired value and then modifying said second control input until said actual slope equals said desired value.

31. The method as in claim 30, wherein said given range is a given percentage above and below a starting base value of said first control input.

32. The method as in claim 27, wherein step (d) includes simultaneously modifying said first control input and said second control input in accordance with a predetermined apportionment formula.

33. The method as in claim 32, wherein said predetermined formula is such that said first control unit is modified by a predetermined proportion of the modification made to said second control input.

34. The method as in claim 27, wherein said particular control input is the same input as one of said first control input and said second control input.

35. The method as in claim 27, wherein said particular control input is different from both said first control input and said second control input.

36. A method of controlling a power producing engine having at least two control inputs which affect an engine output, said method comprising:

(a) establishing a first base value for a first said control input as a function of engine operating conditions;

(b) establishing a second base value for asecond said control input as a function of engine operating conditions;

(c) periodically perturbing a particular said control input;

(d) determining an actual slope or differential of said engine output with respect to perturbations said particular control input; and (e) applying corrections to said first base value and said second base value to obtain corrected values for said first control input and corrected values for said second control input and causing said actual slope to correspond to a desired slope value.

37. The method as in claim 36, wherein said engine is an internal combustion engine, said first control input is an ignition timing input, said second control input is a fuel mixture control input, and said particular control input is said first control input.

38. The method as in claim 37, wherein said fuel mixture control input is one of an air/fuel ratio control input and an exhaust gas recirculation input.

39. The method as in claim 37, further comprising detecting engine roughness and overriding one of said first corrected value and said second corrected value when engine roughness exceeds a predetermined level.

40. The method as in claim 36, further comprising modifying said first base value and said second base value after corrections therefore have become stabilized to obtain a modified first base value and a modified second base value, respectively, corresponding to prevailing engine operating conditions such that said actual slope is caused to correspond more quickly to said desired slope.

41. The method as in claim 36, wherein step (e) includes first applying corrections up to a predetermined maximum magnitude to one of said first base value and said second base value and thereafter applying corrections to the other of said first base value and said second base value.

42. The method as in claim 36, wherein step (e) includes applying corrections simultaneously to both said first base value and said second base value, said corrections being related to each other by a predetermined formula.

43. The method as in claim 36, wherein said engine is a multi-cylinder engine, and said method further comprises (i) establishing a plurality of of cylinder combinations each combination including at least one cylinder, and (ii) selecting each combination in turn, and wherein step (c) includes perturbing said particular control input for each cylinder combination when it is selected, step (d) includes determining the slope for each cylinder combination when it is selected and step (e) includes applying corrections individually to at least one of said first base value and said second base value for each cylinder combination such that a desired value of said slope is obtained for each cylinder combination.

* * * * *